(12) United States Patent
Tanaka et al.

(10) Patent No.: US 7,762,141 B2
(45) Date of Patent: Jul. 27, 2010

(54) PRESSURE SENSOR AND MANUFACTURING METHOD THEREOF

(75) Inventors: Hiroaki Tanaka, Kariya (JP); Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 90 days.

(21) Appl. No.: 12/226,613

(22) PCT Filed: Feb. 12, 2008

(86) PCT No.: PCT/JP2008/052606

§ 371 (c)(1),
(2), (4) Date: Oct. 23, 2008

(87) PCT Pub. No.: WO2008/099951

PCT Pub. Date: Aug. 21, 2008

(65) Prior Publication Data

US 2009/0071259 A1    Mar. 19, 2009

(30) Foreign Application Priority Data

Feb. 16, 2007 (JP) ............... 2007-036302
Sep. 7, 2007 (JP) ............... 2007-232750
Jan. 30, 2008 (JP) ............... 2008-019203

(51) Int. Cl.
*G01L 9/12* (2006.01)
*H05K 3/00* (2006.01)

(52) U.S. Cl. ............... 73/725; 73/754; 29/852

(58) Field of Classification Search ............... None
See application file for complete search history.

(56) References Cited

U.S. PATENT DOCUMENTS

| 5,163,329 A * | 11/1992 | Shimaoka et al. ............ 73/721 |
| 5,591,679 A | 1/1997 | Jakobsen et al. |
| 6,575,038 B1 | 6/2003 | Takakuwa et al. |

(Continued)

FOREIGN PATENT DOCUMENTS

JP    A-10-274582    10/1998

(Continued)

OTHER PUBLICATIONS

International Search Report and Written Opinion mailed from the ISA of the European Patent Office on Jul. 25, 2008 for the corresponding International patent application No. PCT/US2008/052606.

(Continued)

*Primary Examiner*—Andre J Allen
(74) *Attorney, Agent, or Firm*—Posz Law Group, PLC

(57) ABSTRACT

A pressure sensor for a pressure medium includes: a sensor chip including a semiconductor substrate, a diaphragm in the substrate and a gauge resistor on the diaphragm; a protection cap covering the diaphragm; a case for accommodating the chip, introducing the pressure medium to the cap, and atmospheric air to the substrate; a terminal; a wiring; and a seal member. An embedded portion of the wiring is coupled with the gauge resistor. A connection portion of the wiring couples the embedded portion and the terminal. The embedded portion is covered with the cap to be isolated from the pressure medium. The seal member is disposed between the case and the substrate to isolate the connection portion from the pressure medium and the atmospheric air.

26 Claims, 16 Drawing Sheets

U.S. PATENT DOCUMENTS

| | | |
|---|---|---|
| 6,612,175 B1 | 9/2003 | Peterson et al. |
| 7,152,478 B2 | 12/2006 | Peterson et al. |
| 7,210,357 B2 | 5/2007 | Tanaka et |
| 7,287,433 B2 * | 10/2007 | Tanaka ......................... 73/727 |
| 2003/0200813 A1 * | 10/2003 | Baba et al. .................... 73/715 |
| 2004/0163475 A1 * | 8/2004 | Ikezawa et al. ............... 73/753 |
| 2005/0109113 A1 * | 5/2005 | Baba .......................... 73/700 |
| 2005/0199070 A1 * | 9/2005 | Koike et al. ................... 73/723 |
| 2006/0288793 A1 * | 12/2006 | Tanaka ......................... 73/754 |
| 2007/0013014 A1 | 1/2007 | Guo et al. |

FOREIGN PATENT DOCUMENTS

| | | |
|---|---|---|
| JP | A-2001-343298 | 12/2001 |
| JP | A-2005-227039 | 8/2005 |

OTHER PUBLICATIONS

Office Communication from the European Patent Office dated Dec. 2, 2009 in the corresponding European patent application No. 08 711 430.2-1236.

* cited by examiner

RECEIVED PRESSURE

ATMOSPHERE PRESSURE

PRESSURE SENSOR AND MANUFACTURING METHOD THEREOF

CROSS REFERENCE TO RELATED APPLICATIONS

This application is a U.S. national stage application of PCT/JP2008/0052606 filed on Feb. 12, 2008, based on Japanese Patent Applications No. 2007-36302 filed on Feb. 16, 2007, No. 2007-232750 filed on Sep. 7, 2007, and No. 2008-19203 filed on Jan. 30, 2008, the disclosures of which are incorporated herein by reference.

TECHNICAL FIELD

The present invention relates to a pressure sensor and a manufacturing method of a pressure sensor.

BACKGROUND ART

Conventionally, in a pressure sensor as shown in JP-A-2001-343298, bonding wires are covered with rubber or gel thereby protected from environmental conditions such as fluidity and corrosion of pressure medium as a measuring object, and reliability is ensured.

Further, in a pressure sensor as shown in JP-3073442 corresponding to U.S. Pat. No. 5,591,679, in a silicon chip, an area in which a gauge resistor (piezo element) is formed is covered with glass.

In recent years, in accordance with advancement of high-precision and multifunction vehicle control, there is a necessity to measure the pressure of a pressure medium with extremely high corrosiveness. However, in the pressure sensor disclosed in JP-A-2001-343298, as the bonding wires and peripheral connection structure are merely covered with rubber or gel, such pressure measurement on high corrosiveness pressure medium might degrade the rubber or gel and disable protection of the bonding wires and peripheral connection structure. Further, in the pressure sensor disclosed in JP-3073442, as the gauge resistor is merely covered with glass and the wirings are exposed, corrosion caused by the pressure medium cannot be prevented.

DISCLOSURE OF THE INVENTION

In view of the above-described problem, it is an object of the present disclosure to provide a pressure sensor. It is another object of the present disclosure to provide a manufacturing method of a pressure sensor.

According to a first aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor is disposed on the first diaphragm; a protection cap covering the first diaphragm and bonded to the first side of the semiconductor substrate; a case including a hollow portion for accommodating the sensor chip with the protection cap and a mounting surface for mounting the sensor chip, wherein the case introduces the pressure medium to a pressure receiving surface of the protection cap, and introduces atmospheric air to the second side of the semiconductor substrate; a terminal electrically coupling between the sensor chip and an external circuit; a wiring electrically coupling between the gauge resistor and the terminal; and a seal member having a ring shape. When the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit. The wiring includes an embedded portion and a connection portion. The embedded portion is embedded in the hole of the semiconductor substrate through an inner wall insulation film so that the embedded portion is insulated from the semiconductor substrate with the inner wall insulation film, and electrically coupled with the gauge resistor. The connection portion is disposed between a part of the embedded portion and a part of the terminal so that the connection portion electrically couples between the embedded portion and the terminal, the part of the embedded portion exposed from the second surface of the semiconductor substrate and the part of the terminal exposed from the mounting surface of the case. The embedded portion is covered with the protection cap so that the embedded portion is isolated from the pressure medium. The seal member is disposed between the mounting surface of the case and the second side of the semiconductor substrate. The hollow portion includes a first hollow portion and a second hollow portion. The pressure medium is introduced into the first hollow portion, and the atmospheric air is introduced into the second hollow portion. The seal member separates the first hollow portion from the second hollow portion so that pressure difference between the first and second hollow portions is maintained. The seal member isolates the connection portion from the pressure medium and the atmospheric air.

In the above sensor, the embedded portion is covered with the protection cap to be separated from the pressure medium, and the connection portion is separated from the pressure medium and the atmospheric air with the seal member. Accordingly, the embedded portion and the connection portion are prevented from corroding.

According to a second aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor is disposed on the first diaphragm; a base having a plate shape and bonded to the second side of the semiconductor substrate, wherein the base further includes a first through hole; a protection cap covering the first diaphragm and bonded to the first side of the semiconductor substrate; a case including a hollow portion for accommodating the sensor chip with the protection cap and the base and a mounting surface for mounting the sensor chip, wherein the case introduces the pressure medium to a pressure receiving surface of the protection cap; a terminal electrically coupling between the sensor chip and an external circuit; a wiring electrically coupling between the gauge resistor and the terminal; and a seal member having a ring shape. When the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit. The wiring includes an embedded portion and a connection portion. The embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor. The connection portion is disposed between a part of the embedded portion and a part of the terminal so that the connection portion couples between the embedded portion and the terminal, the part of the embedded portion exposed from the second surface of the semiconductor substrate and the part of the terminal exposed from the mounting surface of the case. The embedded portion is covered with the protection cap so that the embedded portion is isolated from the pressure medium. The seal member is disposed between the mounting surface of the case and the base. The pressure medium is introduced into the hollow portion. The hollow portion is separated from the connection portion by the seal member so that the seal member isolates the connection portion from the pressure medium.

In the above sensor, the embedded portion is covered with the protection cap to be separated from the pressure medium, and the connection portion is separated from the pressure medium with the seal member. Accordingly, the embedded portion and the connection portion are prevented from corroding. In this case, the height of the wiring may be equal to or lower than the height of a connection layer between the protection cap and the semiconductor substrate. Here, the connection layer may be made of an oxide film or a metallic film. Further, the pressure sensor may be a relative pressure sensor or an absolute pressure sensor. In case of absolute pressure sensor, the base is made of silicon directly bonded through an oxide film or glass anodic bonded through the oxide film, and contacts a mounting surface of the case. The bump may have a portion disposed on the semiconductor substrate side and another portion disposed on the mounting surface side before the bump is connected.

According to a third aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor is disposed on the first diaphragm; a base having a plate shape and bonded to the second side of the semiconductor substrate, wherein the base further includes a first through hole; a protection cap covering the first diaphragm and bonded to the first side of the semiconductor substrate; a case including a hollow portion for accommodating the sensor chip with the protection cap and the base and a mounting surface for mounting the sensor chip, wherein the case introduces the pressure medium to a pressure receiving surface of the protection cap; a terminal electrically coupling between the sensor chip and an external circuit; and a wiring electrically coupling between the gauge resistor and the terminal. When the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit. The wiring includes an embedded portion. The embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor. The embedded portion is covered with the protection cap so that the embedded portion is isolated from the pressure medium. The base directly contacts the mounting surface of the case so that the embedded portion is directly coupled with the terminal. The pressure medium is introduced into the hollow portion. A connection portion between the embedded portion and the terminal is isolated from the hollow portion.

In the above sensor, the embedded portion is covered with the protection cap to be separated from the pressure medium, and the connection portion is separated from the pressure medium. Accordingly, the embedded portion and the connection portion are prevented from corroding.

According to a fourth aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side; a protection cap bonded to the first side of the semiconductor substrate, wherein the protection cap is disposed on a periphery of the first diaphragm, and wherein the protection cap includes a second through hole corresponding to the first diaphragm; a case including a hollow portion for accommodating the sensor chip with the protection cap and a mounting surface for mounting the sensor chip, wherein the case introduces the pressure medium to a pressure receiving surface of the first diaphragm, and introduces atmospheric air to the second side of the semiconductor substrate; a terminal electrically coupling between the sensor chip and an external circuit; a wiring electrically coupling between the gauge resistor and the terminal; and a seal member having a ring shape. When the first diaphragm is distorted according to the pressure of the pressure medium introduced to the pressure receiving surface, a resistance of the gauge resistor is changed, and a detection signal corresponding to a resistance change is output through the wiring and the terminal to the external circuit. The wiring includes an embedded portion and a connection portion. The embedded portion is embedded in the hole of the semiconductor substrate through an inner wall insulation film so that the embedded portion is insulated from the semiconductor substrate with the inner wall insulation film, and electrically coupled with the gauge resistor. The connection portion is disposed between a part of the embedded portion and a part of the terminal so that the connection portion couples between the embedded portion and the terminal, the part of the embedded portion exposed from the second surface of the semiconductor substrate and the part of the terminal exposed from the mounting surface of the case. The embedded portion is covered with the protection cap so that the embedded portion is isolated from the pressure medium. The seal member is disposed between the mounting surface of the case and the second side of the semiconductor substrate. The hollow portion includes a first hollow portion and a second hollow portion. The pressure medium is introduced into the first hollow portion, and the atmospheric air is introduced into the second hollow portion. The seal member separates the first hollow portion from the second hollow portion so that pressure difference between the first and second hollow portions is maintained. The seal member isolates the connection portion from the pressure medium and the atmospheric air.

In the above sensor, the embedded portion is covered with the protection cap to be separated from the pressure medium, and the connection portion is separated from the pressure medium and the atmospheric air with the seal member. Accordingly, the embedded portion and the connection portion are prevented from corroding.

According to a fifth aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side; a base having a plate shape and bonded to the second side of the semiconductor substrate, wherein the base further includes a first through hole; a protection cap bonded to the first side of the semiconductor substrate, wherein the protection cap is disposed on a periphery of the first diaphragm, and wherein the protection cap includes a second through hole corresponding to the first diaphragm; a case including a hollow portion for accommodating the sensor chip with the protection cap and the base and a mounting surface for mounting the sensor chip, wherein the case introduces the pressure medium to a pressure receiving surface of the first diaphragm; a terminal electrically coupling between the sensor chip and an external circuit; a wiring electrically coupling between the gauge resistor and the terminal; and a seal member having a ring shape. When the first diaphragm is distorted according to the pressure of the pressure medium introduced to the pressure receiving surface, a resistance of the gauge resistor is changed, and a detection signal corresponding to a resistance change is output through the wiring and the terminal to the external circuit. The wiring includes an embedded portion and a connection portion. The embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor. The connection portion is disposed between a part of the embedded portion and a part of the terminal so that the connection portion is coupled between the embedded portion and the terminal, the part of the embedded portion exposed from the second surface of the semiconductor substrate and the part of the terminal exposed from the mounting surface of the case. The embedded portion is covered with the protection cap so that the embedded portion is isolated from the pressure medium. The seal member is disposed between the mounting surface of the case and the base. The pressure medium is introduced into the hollow portion. The hollow portion is separated from the connection portion by the seal member so that the seal member isolates the connection portion from the pressure medium.

In the above sensor, the embedded portion is covered with the protection cap to be separated from the pressure medium, and the connection portion is separated from the pressure medium with the seal member. Accordingly, the embedded portion and the connection portion are prevented from corroding.

According to a sixth aspect of the present disclosure, a pressure sensor for detecting pressure of a pressure medium includes: a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side; a base having a plate shape and bonded to the second side of the semiconductor substrate, wherein the base further includes a first through hole; a protection cap bonded to the first side of the semiconductor substrate, wherein the protection cap is disposed on a periphery of the first diaphragm, and wherein the protection cap includes a second through hole corresponding to the first diaphragm; a case including a hollow portion for accommodating the sensor chip with the protection cap and the base and a mounting surface for mounting the sensor chip, wherein the case introduces the pressure medium to a pressure receiving surface of the first diaphragm; a terminal electrically coupling between the sensor chip and an external circuit; and a wiring electrically coupling between the gauge resistor and the terminal. When the first diaphragm is distorted according to the pressure of the pressure medium introduced to the pressure receiving surface, a resistance of the gauge resistor is changed, and a detection signal corresponding to a resistance change is output through the wiring and the terminal to the external circuit. The wiring includes an embedded portion. The embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor. The embedded portion is covered with the protection cap so that the embedded portion is isolated from the pressure medium. The base directly contacts the mounting surface of the case so that the embedded portion is directly coupled with the terminal. The pressure medium is introduced into the hollow portion. A connection portion between the embedded portion and the terminal is isolated from the hollow portion.

In the above sensor, the embedded portion is covered with the protection cap to be separated from the pressure medium, and the connection portion is separated from the pressure medium. Accordingly, the embedded portion and the connection portion are prevented from corroding.

According to a seventh aspect of the present disclosure, a method for manufacturing a pressure sensor for detecting pressure of a pressure medium, the method includes: forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm; forming a hole in the substrate, wherein the hole penetrates the substrate from the first side to the second side; forming an inner wall insulation film on an inner wall of the hole; forming an embedded portion of a wiring in the hole of the substrate through the inner wall insulation film so that the embedded portion is insulated from the semiconductor substrate with the inner wall insulation film and the embedded portion is electrically coupled with the gauge resistor; forming an interlayer insulation film on the gauge resistor, and forming a contact hole in the interlayer insulation film; forming a surface portion of the wiring in the contact hole and on the interlayer insulation film so as to electrically couple between the gauge resistor and the embedded portion; forming a protection film including at least one of an oxide-film and a nitride film on the semiconductor substrate with the surface portion and the gauge resistor; forming a protection cap having a second diaphragm, which is formed by thinning the protection cap to have a second concavity, wherein the second concavity provides the second diaphragm; bonding the protection cap on the first side of the substrate through a connection layer made of a $SiO_2$ film or a metallic film in such a manner that the second diaphragm faces the gauge resistor and the second concavity accommodates the first diaphragm and the embedded portion of the wiring; forming a case including a hollow portion for accommodating the sensor chip with the protection cap and a mounting surface for mounting the sensor chip, wherein the case further includes an air introduction port on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port; mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port; electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

The above method provides the sensor having the embedded portion and the connection portion. The embedded portion is covered with the protection cap to be separated from the pressure medium, and the connection portion is separated from the pressure medium. Accordingly, the embedded portion and the connection portion are prevented from corroding.

In the above method, the gauge resistor may be formed in a diffusion process of an impurity for penetrating through the oxide film. The oxide film as an insulation film may be formed on the inner wall of the hole in an oxidation process. A part of the wiring for coupling between the gauge resistor and the embedded portion may be formed together with forming the contact portion. After the semiconductor substrate is covered with the oxide film, the first diaphragm may be formed in the semiconductor substrate. At this time, the nitride film disposed at a connection portion of the protection cap may be removed. Alternatively, the conductive bump may be formed in such a manner that a half of material for forming the bump is applied on a backside of the semiconductor substrate, and the other half of the material is applied on the mounting surface, and then, the half of the material and the other half of the material may be heated and bonded to each other.

According to an eighth aspect of the present disclosure, a method for manufacturing a pressure sensor for detecting pressure of a pressure medium, the method includes: forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm; forming a hole in the substrate, wherein the hole penetrates the substrate from the first side to the second side; forming a concavity on a surface of the gauge resistor; forming an inner wall insulation film in the hole of the substrate and on the concavity of the gauge resistor; forming a contact hole in the inner wall insulation film on the gauge resistor; forming an embedded portion of a wiring in the hole of the substrate through the inner wall insulation film and in the contact hole through the inner wall insulation film so that the embedded portion is insulated from the semiconductor substrate with the inner wall insulation film and the embedded portion is electrically coupled with the gauge resistor; forming a protection cap having a through hole, which penetrates the protection cap; bonding the protection cap on the first side of the substrate through a connection layer made of a $SiO_2$ film or a metallic film in such a manner that the first diaphragm faces the through hole of the protection cap, and the protection cap covers the embedded portion of the wiring; forming a case including a hollow portion for accommodating the sensor chip with the protection cap and a mounting surface for mounting the sensor chip, wherein the case further includes an air introduction port on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port; mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port; electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

The above method provides the sensor having the embedded portion and the connection portion. The embedded portion is covered with the protection cap to be separated from the pressure medium, and the connection portion is separated from the pressure medium. Accordingly, the embedded portion and the connection portion are prevented from corroding.

In the above method, the gauge resistor may be formed on the semiconductor substrate in a diffusion process of an impurity for penetrating through an oxide film. After that, the oxide film may be deposited, and then, the hole may be formed in the substrate. In an oxidation process, the oxide film as an insulation film may be formed on an inner wall of the hole, and then, the hole is filed with a conductive material. Next, a part of the wiring for coupling between the gauge resistor and the embedded portion may be formed at the contact portion, and then, the oxide film as a protection film may be formed on the semiconductor substrate. Then, a part of the nitride film at a connection portion of the protection cap may be removed. The protection cap and the semiconductor substrate may be bonded so as to cover the part of the wiring disposed on the chip and the embedded portion Then, the first diaphragm may be formed in the semiconductor substrate.

According to a ninth aspect of the present disclosure, a method for manufacturing a pressure sensor for detecting pressure of a pressure medium, the method includes: forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm; forming a hole in the substrate, wherein the hole penetrates the substrate from the first side to the second side so as to reach the gauge resistor; forming an inner wall insulation film on an inner wall of the hole; forming an embedded portion of a wiring in the hole of the substrate through the inner wall insulation film so that the embedded portion is insulated from the semiconductor substrate with the inner wall insulation film and the embedded portion is electrically coupled with the gauge resistor; forming a protection cap for covering the first side of the substrate, wherein the protection cap is made of an epitaxial growth layer or a silicon nitride covering film; forming a case including a hollow portion for accommodating the sensor chip with the protection cap and a mounting surface for mounting the sensor chip, wherein the case further includes an air introduction port on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port; mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port; electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

The above method provides the sensor having the embedded portion and the connection portion. The embedded portion is covered with the protection cap to be separated from the pressure medium, and the connection portion is separated from the pressure medium. Accordingly, the embedded portion and the connection portion are prevented from corroding.

In the above method, the gauge resistor may be formed in the semiconductor substrate in a diffusion process of an impurity for penetrating through an oxide film. After that, the oxide film as a protection film may be deposited. Then, the hole may be formed in the substrate, and excess silicon member disposed on an end of the gauge resistor may be removed. In an oxidation process, the oxide film may be formed on an inner wall of the hole and a space at which the excess silicon member is removed. Then, the hole is filled with a conductive material. A connection wiring having a thickness thinner than the removed silicon member may be formed between the gauge resistor and the embedded portion together with forming the contact portion. Then, the oxide film functioning as a connection element may be formed over the semiconductor substrate so that the oxide film covers whole of the chip. After that, the substrate is bonded. Alternatively, the protection cap made of N conductive type epitaxial growth film or a silicon nitride film may be formed. Then, the first diaphragm may be formed in the substrate.

BRIEF DESCRIPTION OF THE DRAWINGS

The above and other objects, features and advantages of the present invention will become more apparent from the following detailed description made with reference to the accompanying drawings. In the drawings.

PREFERRED EMBODIMENTS FOR CARRYING OUT THE INVENTION

First Embodiment

A pressure sensor to which a first embodiment is applied will be described. The pressure sensor described in the present embodiment is used as e.g. an exhaust pressure sensor in a vehicle.

Figure 1A:
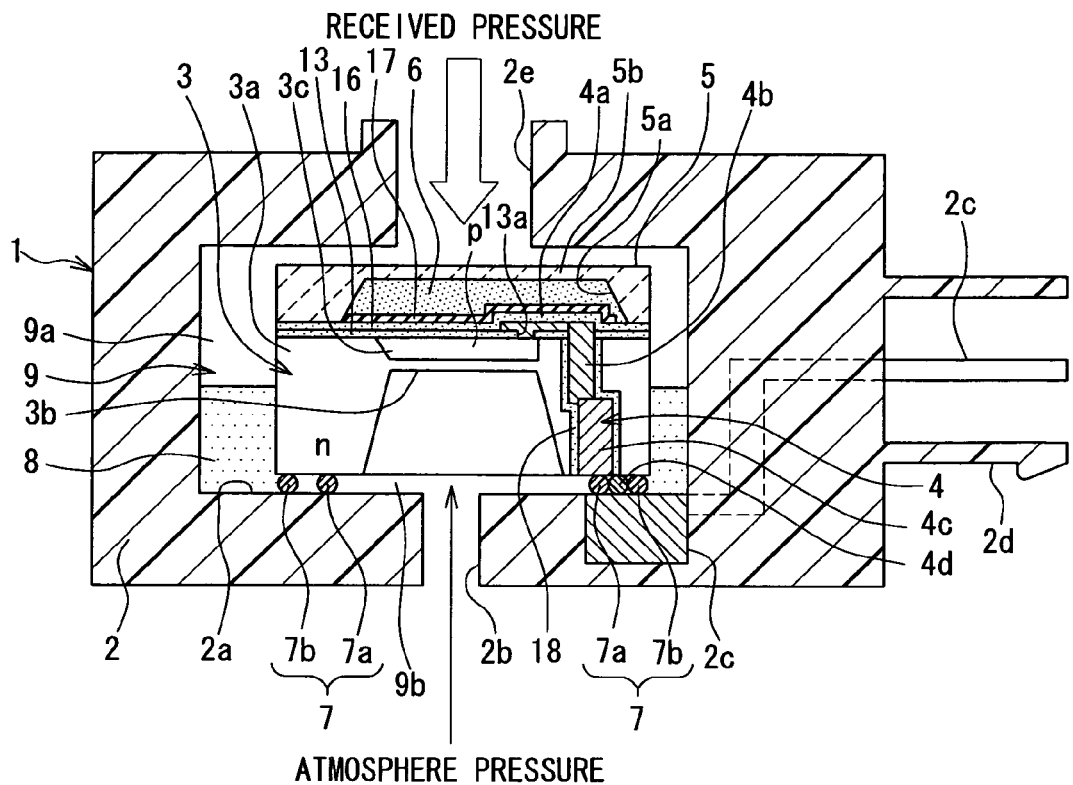
FIG. 1A is a cross-sectional view (along a line IA-IA in FIG. 1B) showing a schematic structure of a pressure sensor according to a first embodiment of the present disclosure.
Figure 1B:
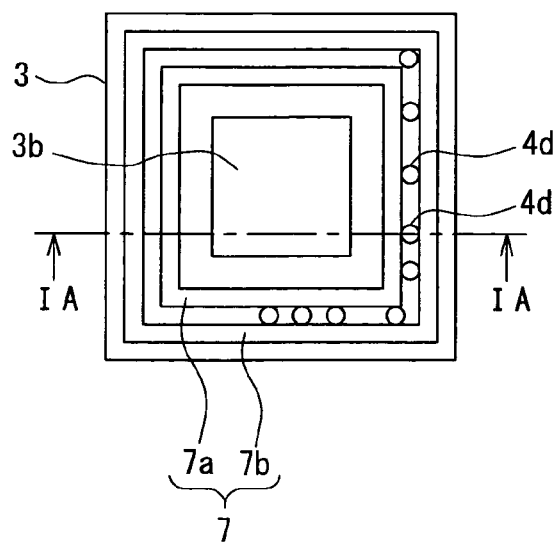
FIG. 1B is a front view showing a layout of the pressure sensor.

FIGS. 1A and 1B show a schematic structure of a pressure sensor 1 of the present embodiment. FIG. 1A is a cross-sectional view of the pressure sensor 1 (corresponding to an IA-IA cross section in FIG. 1B). FIG. 1B is a front view showing the layout of the pressure sensor 1. Hereinbelow, the pressure sensor 1 of the present embodiment will be described using these figures.

As shown in FIG. 1A, the pressure sensor 1 has a case 2, a sensor chip 3, wirings 4, a protection cap 5, a pressure transmission medium 6, a seal member 7, a protective material 8 and the like.

The case 2 forms the outer shape of the pressure sensor 1, and has space 9 inside. The sensor chip 3 and the like are accommodated in the space 9 of the case 2. One of the wall surfaces (a surface on the lower side of the drawing) forming the space 9 of the case 2 is used as a mounting surface 2a for the sensor chip 3. In e.g. the central position of the mounting surface 2a, an atmosphere introduction hole 2b is formed, and the rear surface of the sensor chip 3 is mounted in a position corresponding to the atmosphere introduction hole 2b.

One end of a terminal 2c for electric connection with the wirings 4 is exposed on the mounting surface 2a of the case 2. Further, the case 2 is provided with a connector 2d. The other end of the terminal 2c is exposed from the connector 2d, thereby electric connection between the pressure sensor 1 and the outside is enabled. Further, in the case 2, in a position opposite to the atmosphere introduction hole 2b, a pressure introduction hole 2e is formed. A pressure medium is introduced through the pressure introduction hole 2e. When the sensor chip 3 and the like are mounted on the mounting surface 2a, the space 9 is partitioned into space 9a in which the pressure medium is introduced through the pressure introduction hole 2e, and space 9b in which the atmosphere is introduced through the atmosphere introduction hole 2b.

The sensor chip 3, having a semiconductor substrate 3a of e.g. n-type silicon, has a thin diaphragm 3b as a concavity formed by etching or the like in the rear surface of the semiconductor substrate 3a, and an electric circuit including a p-type gauge resistor 3c formed in the diaphragm 3b. The surface of the gauge resistor 3c is covered with a protection film made of an insulation film such as a nitride film 17 and an oxide film 16 in addition to the oxide film 13. As the rear surface side of the sensor chip 3 is opposite to the mounting surface 2a of the case 2 and the atmosphere is introduced to the diaphragm 3b from the rear surface side of the sensor chip 3 through the atmosphere introduction hole 2b, atmospheric pressure as a reference pressure is applied to the diaphragm 3. In this structure, the pressure of the pressure medium to the atmospheric pressure, i.e., relative pressure can be measured.

The wirings 4 are electrically connected with the gauge resistor 3c through a contact hole 13a (or connected with the electric circuit including the gauge resistor 3c). The contact hole 13a is formed in the silicon oxide film 13 for functioning as an interlayer insulation film. The wirings 4 are used for electric connection between the electric circuit including the gauge resistor 3c and the outside via the terminal 2c. More particularly, the wirings 4 include a surface pattern 4a formed by patterning on the surface of the semiconductor substrate 3a through the silicon oxide film 13, a first embedded wiring 4b embedded in a first hole formed from the front surface side of the semiconductor substrate 3a, a second embedded wiring 4c embedded in a second hole formed from the rear surface side of the semiconductor substrate 3a through an inner wall insulation film 18, and a bump 4d as a joint member provided between the rear surface of the semiconductor substrate 3a and the mounting surface 2a of the case 2. The inner wall insulation film 18 is formed on an inner wall of each of the first and second holes. The bump 4d is electrically conductive.

In the semiconductor substrate 3a, the first hole and the second hole are connected as a through hole, and the first embedded wiring 4b and the second embedded wiring 4c formed in these first and second holes through the inner wall insulation film 18 are connected inside the semiconductor substrate 3a. The bump 4d is provided in contact with the second embedded wiring 4c and the terminal 2c exposed from the mounting surface 2a of the case 2. Accordingly, the electric circuit including the gauge resistor 3c and the terminal 2c are electrically connected with each other via the surface pattern 4a and the first and second embedded wirings 4b and 4c and the bump 4d.

The protection cap 5 covers the sensor chip 3 thereby protects the wirings 4 and the like, and further, receives the pressure medium. In the protection cap 5, a concave member 5a is formed in the rear surface opposite to the front surface side of the sensor chip 3, and the portion of the concave member 5a is used as a thin diaphragm 5b. Further, in the protection cap 5, the outer portion than the concave member 5a is joined to the outer edge of the sensor chip 3 on the front surface side. As the gauge resistor 3c and the wirings 4 are included in the concave member 5a of the protection cap 5, the protection cap 5 prevents the gauge resistor 3c and the wirings 4 from contact with the pressure medium. The protection cap 5 is formed of semiconductor material such as Si, ceramics or the like. When the protection cap 5 is formed of semiconductor material, the concave member 5a can be formed by etching. When the protection cap 5 is formed of ceramics or the like, the concave member 5a can be formed in accordance with the shape of a molding die. Here, the sensor chip 3 and the protection cap 5 may be bonded to each other without any connection intermediate layer. Alternatively, the sensor chip 3 may be bonded to the protection cap 5 through the connection intermediate layer such as an oxide film and a metallic film. When the connection intermediate layer is used for connection, a surface protection film such as the oxide film 16 and the nitride film 17 may not be formed on the surface of the sensor chip 3. Thus, if the surface protection film is not formed, the manufacturing process of the device on the sensor chip side is reduced.

The pressure transmission medium 6 functions for transmission of pressure filled between the sensor chip 3 and the protection cap 5, i.e., in the concave member 5a of the protection cap 5. When the pressure medium is received with the diaphragm 5b of the protection cap 5, the distortion of the diaphragm 5b is transmitted to the pressure transmission medium 6, thereby pressure corresponding to the pressure of the pressure medium is applied via the pressure transmission medium 6 to the diaphragm 5b on the sensor chip 3 side. As such pressure transmission medium 6, liquid such as oil or water, gaseous matter such as hydrogen or rare gas, or gel of resin, or the like, may be employed.

The seal member 7 partitions the space 9 into the space 9a in which the pressure medium is introduced and the space 9b in which the atmosphere is introduced, and keeps the pressure difference therebetween. In the present embodiment, the seal member 7 has two ring members 7a and 7b surrounding the diaphragm 3b. One ring member 7a is provided in a position on the inner side of the bump 4d, and the other ring member 7b is provided in a position on the outer side of the bump 4d so as to surround the ring member 7a. The one ring member 7a prevents entrance of the atmosphere to the bump 4d side, and the other ring member 7b prevents entrance of the pressure medium and the protective material 8 to the bump 4d side. As the seal member 7, a sealing nonconductive film (NCF) or the like may be used.

The protective material 8 protects the seal member 7 from the pressure medium with high corrosiveness such as exhaust gas. The protective material 8 is filled between the case 2, and the sensor chip 3 and the seal member 7. As the protective material 8, silicone gel, chlorosilicone gel or the like may be used. In the pressure sensor 1 of the present embodiment, as the wirings 4 are not formed of bonding wires, resin may be employed as the protective material 8.

In the pressure sensor 1 having the above structure, the wirings 4 are covered with the protection cap 5, and separated from the pressure medium and the atmosphere with the seal member 7. In this structure where the wirings 4 are not exposed to be in contact with the pressure medium, corrosion of the wirings 4 can be prevented. Note that in the present embodiment, as shown in FIG. 1A, a part of the terminal 2c is provided on the outer side than the ring member 7b, i.e., on the side in contact with the protective material 8. However, in the terminal 2c, which is different from a thin member such as a bonding wire, contact failure is not easily caused by corrosion. Further, when all the exposed part of the terminal 2c is provided inside the ring member 7b, the problem of corrosion can be further reduced.

Next, a manufacturing method of the pressure sensor 1 of the present embodiment will be described. FIGS. 2A to 2F and FIGS. 3A to 3E are cross-sectional views showing manufacturing processes of the pressure sensor 1 of the present embodiment.

Figure 2A:
FIGS. 2A to 2F are cross-sectional views showing manufacturing processes of the pressure sensor shown in FIGS. 1A and 1B.
Figure 2B:
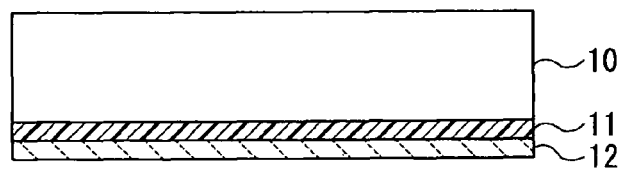
Figure 2C:
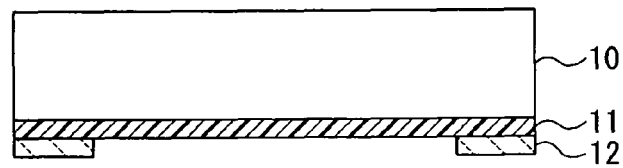

First, in the process shown in FIG. 2A, a silicon substrate 10 is prepared as a substrate for formation of the protection cap 5. Next, in the process shown in FIG. 2B, a mask 11 of a silicone nitride film or the like is provided on the rear surface side of the silicone substrate 10. Then resist 12 is provided on the surface of the mask 11. Further, in the process shown in FIG. 2C, patterning is performed on the resist 12 by photolithography, and the resist 12 is removed in a position where the concave member 5a is to be formed.

Figure 2D:
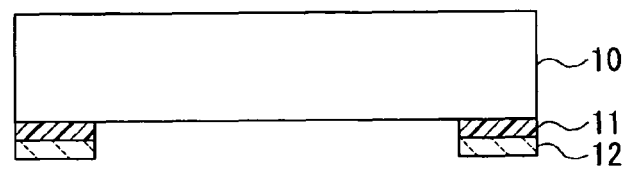
Figure 2E:
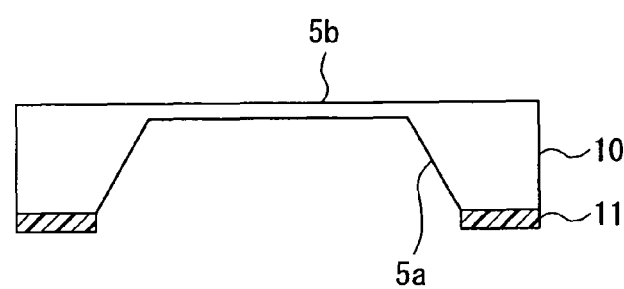
Figure 2F:
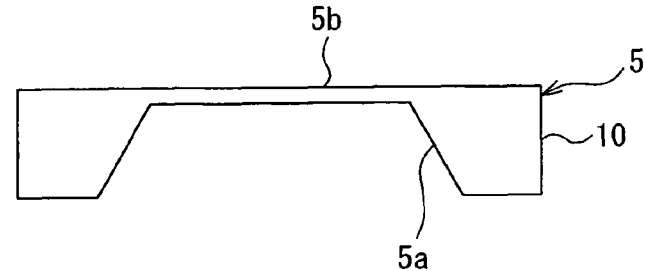

Next, in the process shown in FIG. 2D, an opening is formed in the mask 11 with the resist 12 as a mask. In the process shown in FIG. 2E, the concave member 5a is formed in the rear surface of the silicone substrate 10 by etching using the mask 11. Thus the thinned portion in the concave member 5a becomes the diaphragm 5b. As shown in FIG. 2F, when the mask 11 is removed, the protection cap 5 is completed.

Figure 3A:
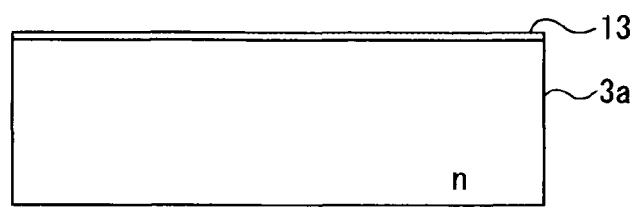
FIGS. 3A to 3E are cross-sectional views showing the manufacturing processes of the pressure sensor subsequent to FIGS. 2A to 2F.

Next, in the process shown in FIG. 3A, an n-type silicone substrate is prepared as the semiconductor substrate 3a. In the process shown in FIG. 3B, a silicon oxide film 13 is formed by oxidizing the surface of the semiconductor substrate 3a. Further, resist (not shown) or the like is provided on the silicone oxide film 13. Then p-type impurities are ion-implanted then activated, thereby the gauge resistor 3c is formed.

Figure 3B:
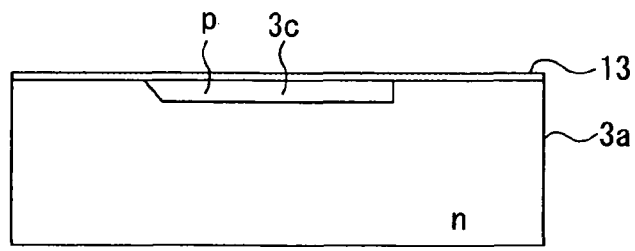
Figure 3C:
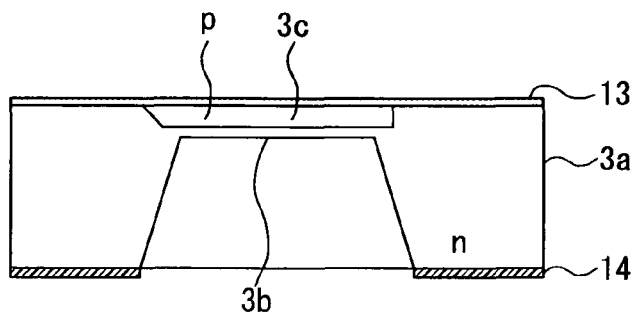

Next, in the process as shown in FIG. 3C, a mask 14 is formed on the rear surface of the semiconductor substrate 3a, then an opening is formed by photo-etching in the mask 14 in a position where the diaphragm 3b is to be formed. Then, a concavity is formed in the rear surface of the semiconductor substrate 3a by etching using the mask 14, thereby the diaphragm 3b is formed. Then, the mask 14 is removed, thereby the sensor chip 3 is completed.

Figure 3D:
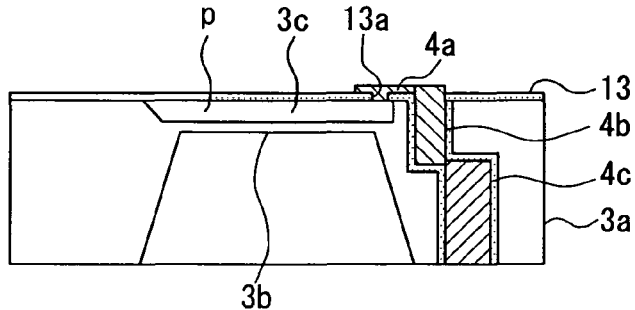

Further, in the process as shown in FIG. 3D, the surface of the semiconductor substrate 3a is covered with a mask (not shown), then an opening is formed in the mask in a position corresponding to the first hole. Then, the first hole is formed from the front surface of the semiconductor substrate 3a by etching using the mask. Next, the mask is removed, then, the inner wall insulation film 18 is formed on an inner wall of the first hole by a thermal oxidation method or a deposition method. Al or the like is deposited to fill the first hole through the inner wall insulation film 18, and patterning is performed on the Al. Further, another mask (not shown) is formed so as to have an opening corresponding to a predetermined position of the gauge resistor 3c. By using this mask, the contact hole 13a is formed in the silicon oxide film 13 by an etching method. Then, Al is deposited on the silicon oxide film 13, and the Al is patterned. Thus the surface pattern 4a and the first embedded wiring 4b of the wirings 4 are provided.

Further, the rear surface of the semiconductor substrate 3a is covered with a mask (not shown), then, an opening is formed in the mask in a position corresponding to the second hole. Then, the second hole is formed from the rear surface of the semiconductor substrate 3a by etching using the mask. Next, the mask is removed, then, the inner wall insulation film 18 is formed on the inner wall of the second hole by using the thermal oxidation method or the deposition method. Al or the like is deposited to fill the second hole through the inner wall insulation film 18. The Al is etched back such that the Al remains only in the second hole. Thus the second embedded wiring 4c of the wirings 4 is provided.

Figure 3E:
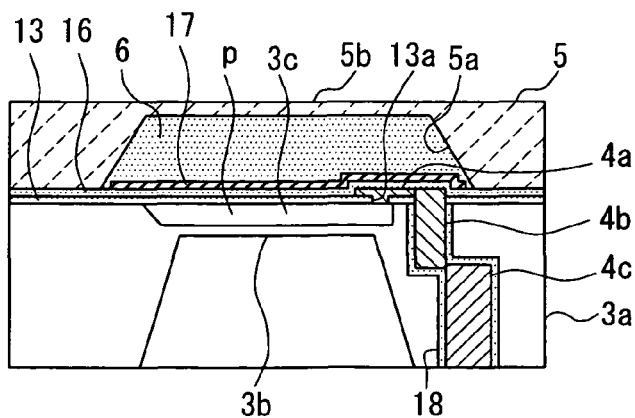

Then, in the process shown in FIG. 3E, the oxide film 16 is formed on the whole surface of the semiconductor substrate 3a including on the gage resistor 3c and the surface pattern 4a by the thermal oxidation method, the deposition method or the like. Furthermore, the nitride film 17 is formed on the oxide film 16 by the deposition method or the like. The outer periphery region of the nitride film 17, which is a region contacting the protection cap 5 on the semiconductor substrate 3a, is removed. Alternatively, if the connection intermediate layer made of an oxide film or a metallic film is formed on the outer periphery region of the protection film 17, it is not necessary to remove the outer periphery region of the nitride film 17.

In a status where the sensor chip 3 formed through the processes in FIGS. 3A to 3D and the protection cap 5 formed through the processes in FIGS. 2A to 2E are placed in a chamber (not shown) filled with hydrogen, rare gas or the like, the protection cap 5 is joined with the surface of the semiconductor substrate 3a, thereby the pressure transmission medium 6 of hydrogen, rare gas or the like is filled therebetween. Note that when the pressure transmission medium 6 is liquid, the liquid is poured into the concave member 5a while the rear surface of the protection cap 5 is turned upward, then the semiconductor substrate 3a is joined with the protection cap 5 from a position above the protection cap 5.

Thereafter, the case 2 in which the terminal 2c is insert-molded is prepared. The bump 4d and the seal member 7 are provided on the mounting surface 2a of the case 2, then the sensor chip 3 with which the protection cap 5 is joined is provided on the mounting surface 2a. Then, the protection cap 5 and the sensor chip 3 are pressed against the mounting surface 2a side, thereby the bump 4d is joined with the terminal 2c and the second embedded wiring 4c, and the seal member 7 is brought into tight contact with the mounting surface 2a and the rear surface of the semiconductor substrate 3a. Then, the protective material 8 is filled in a gap between the case 2, and the sensor chip 3 and the seal member 7. Thus the pressure sensor 1 as shown in FIGS. 1A and 1B is completed.

Note that in FIG. 1, the case 2 is illustrated as a one-part member. However, the case 2 may be formed with two parts. For example, two parts may be integrated after the sensor chip 3 covered with the protection cap 5 is accommodated. Otherwise, the pressure introduction hole 2e may be wide such that the sensor chip 3 covered with the protection cap 5 can be inserted.

Second Embodiment

Next, a second embodiment will be described. In the present embodiment, the structure of the protection cap 5 is changed in the first embodiment. As the other elements are identical to those of the first embodiment, only the difference from the first embodiment will be described.

Figure 4:
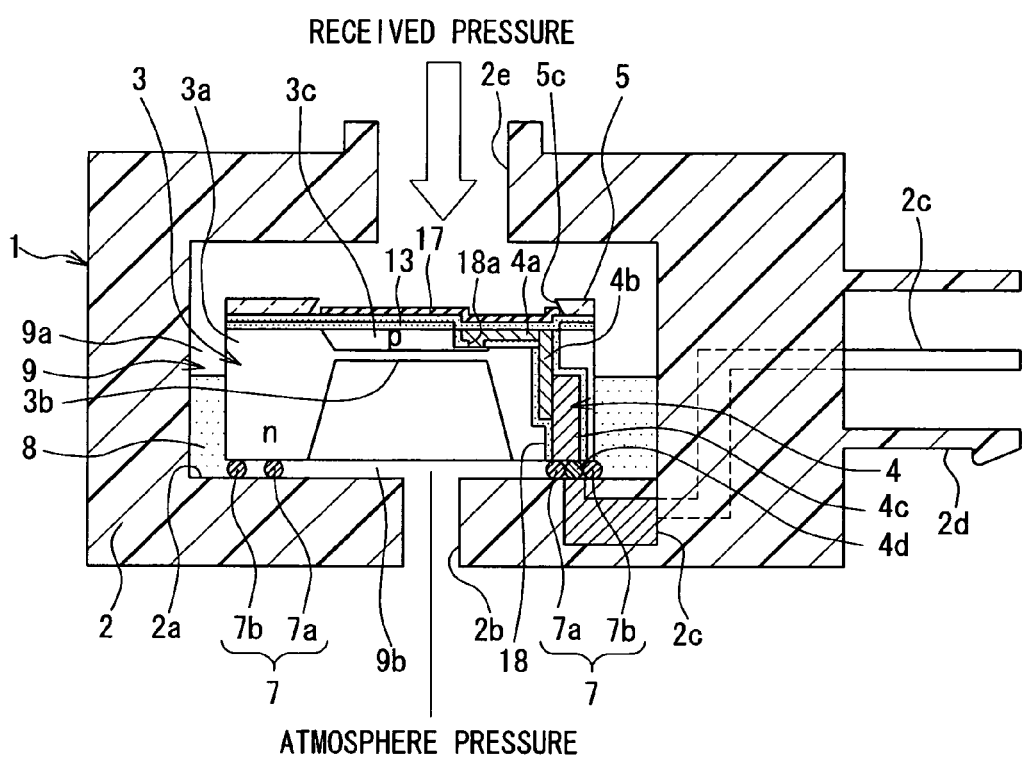
FIG. 4 is a cross-sectional view of a pressure sensor according to a second embodiment of the present invention.
Figure 5A:
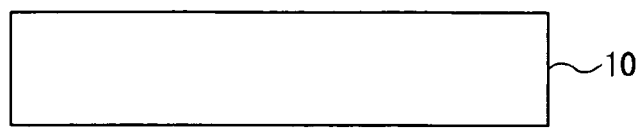
FIGS. 5A to 5F are cross-sectional views showing the manufacturing processes of the pressure sensor shown in FIG. 4.
Figure 5B:
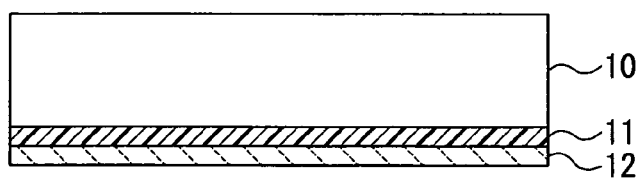
Figure 5C:
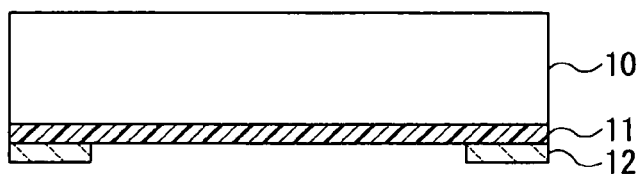
Figure 5D:
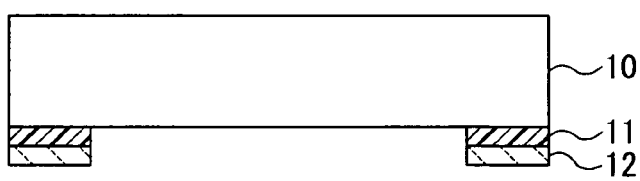
Figure 5E:
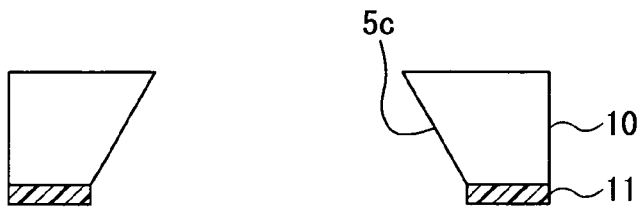
Figure 5F:
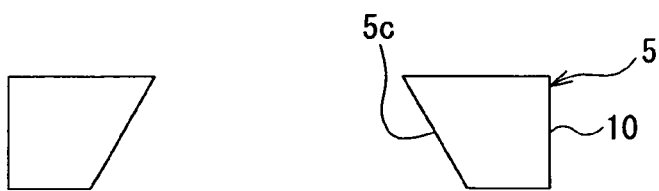

FIG. 4 is a cross-sectional view of the pressure sensor 1 according to the present embodiment. As shown in FIG. 4, in the present embodiment, a concave member 3d is formed in the surface of the semiconductor substrate 3a, and the surface pattern 4a of the wirings 4 is embedded in the concave member 3d. Further, the protection cap 5 is in tight contact with the surface of the semiconductor substrate 3a, and the pressure medium is in direct contact with the diaphragm 3b of the sensor chip 3 through a through hole 5c formed in the protection cap 5. The surface of the surface pattern 4a is completely covered with the protection cap 5, thereby prevented from contact with the pressure medium.

In this structure, as corrosion of the surface pattern 4 by the pressure medium can be prevented, a similar advantage to that obtained in the first embodiment can be obtained.

Next, the manufacturing method of the pressure sensor 1 of the present embodiment will be described. FIGS. 5A to 5F and FIGS. 6A and 6F are cross-sectional views showing the manufacturing processes of the pressure sensor 1 of the present embodiment.

First, in FIGS. 5A to 5D, the processes as shown in FIGS. 2A to 2D are performed. Note that it is preferable that the silicone substrate 10 used for formation of the protection cap 5 is thin in comparison with that in FIG. 2A. Then in the process shown in FIG. 5E, the through hole 5c is formed from the rear surface to the front surface of the silicone substrate 10 by etching using the mask 11. Then in the process shown in FIG. 5F, the mask 11 is removed. Thus the protection cap 5 is completed.

Figure 6A:
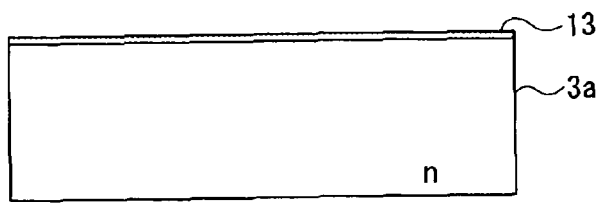
FIGS. 6A and 6F are cross-sectional views showing the manufacturing processes of the pressure sensor subsequent to FIGS. 5A to 5F.
Figure 6B:
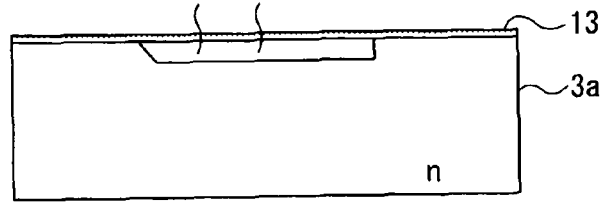
Figure 6C:
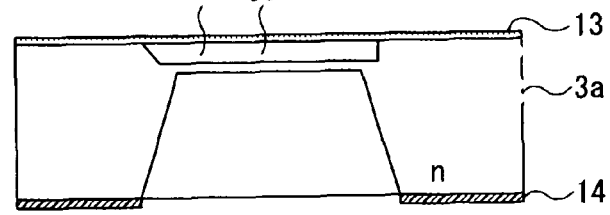
Figure 6D:
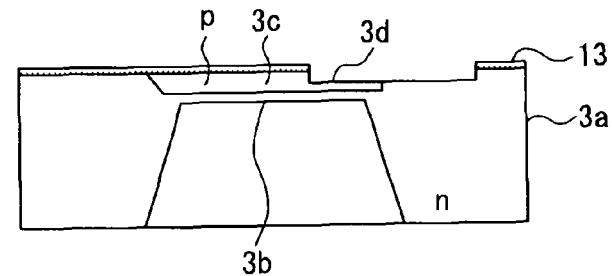

Next, in FIGS. 6A to 6C, the processes as shown in FIGS. 3A to 3C are performed. Then, in the process shown in FIG. 6D, the surface of the semiconductor substrate 3a is covered with a mask (not shown), then an opening is formed in a position corresponding to the surface pattern 4a, more particularly, a desired position outside the diaphragm 3b. Then, the concave member 3d is formed by etching using the mask.

Figure 6E:
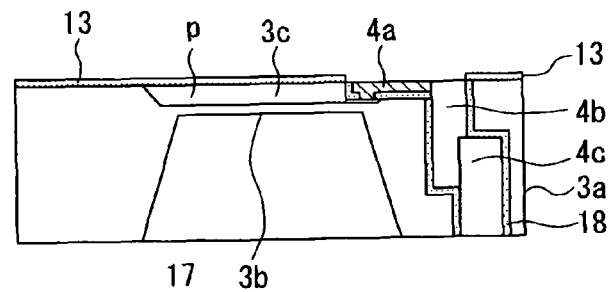

Thereafter, in FIG. 6E, the processing as shown in FIG. 3D is performed. The first and second holes are formed, and the inner wall insulation film 18 is also formed in the first and second holes. Further, the inner wall insulation film 18 is formed in the concavity 3d. A mask (not shown) is formed on the inner wall insulation film 18 to have an opening corresponding to a predetermined position of the gauge resistor 3c. Then, by using the mask, the contact hole 18a is formed by the etching method or the like. The inside of the concave member 3d is filled with the deposited Al, and the patterning is performed such that the upper surface of the surface pattern 4a and the surface of the semiconductor substrate 3a become into a flush-mount status.

Figure 6F:
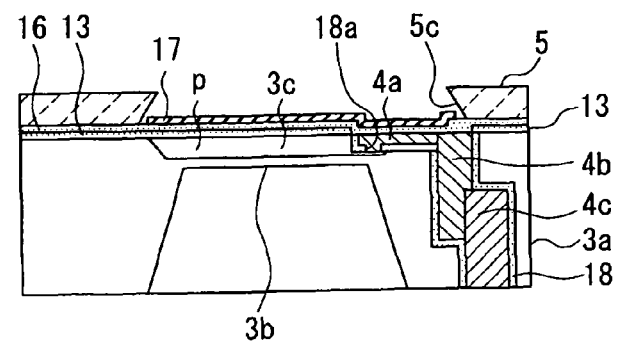

Thereafter, in FIG. 6F, the protection film such as the oxide film 16 and the nitride film 17 is formed on the surface of the semiconductor substrate 3a including on the surface pattern 4a and on the gauge resistor 3c. The outer periphery region of the nitride film 17 is removed. Then, the protection cap 5 is joined with the sensor chip 3 so as to cover the surface pattern 4a. Then, the protective material 8 is filled in the gap between the case 2, and the sensor chip 3 and the seal member 7, thereby the pressure sensor 1 as shown in FIG. 4 is completed.

Third Embodiment

Next, a third embodiment will be described. In the present embodiment, the structures of the protection cap 5 and the wirings 4 are changed in the first embodiment. As the other elements are identical to those of the first embodiment, only the difference from the first embodiment will be described.

Figure 7:
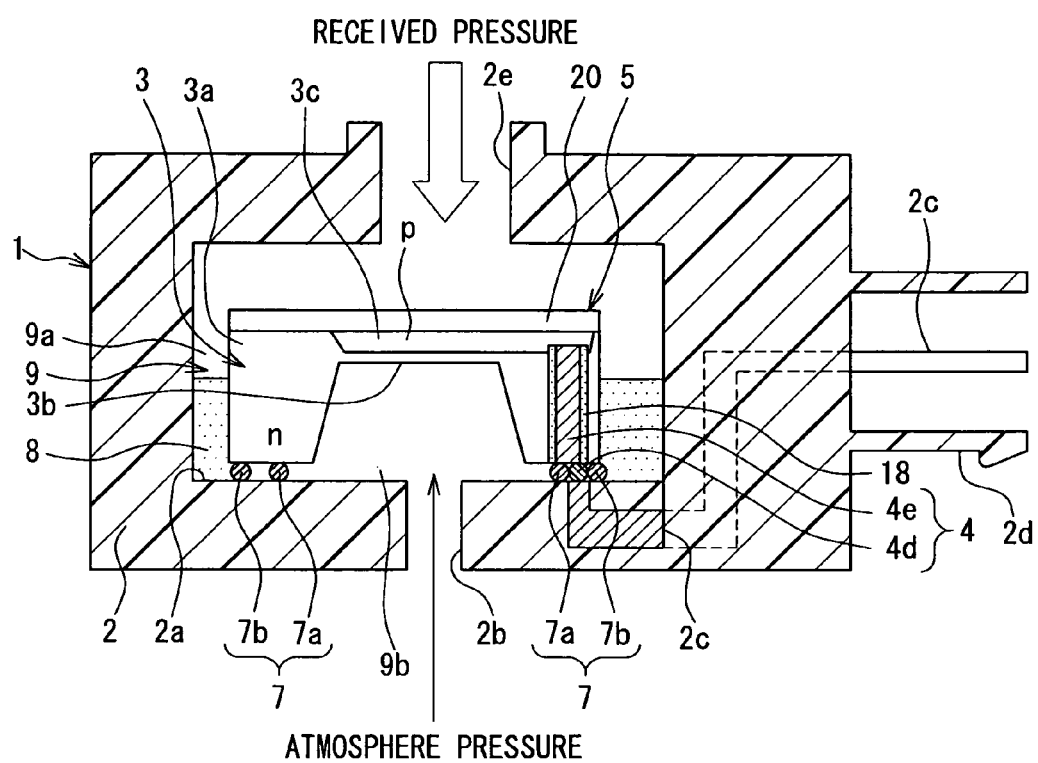
FIG. 7 is a cross-sectional view of a pressure sensor according to a third embodiment of the present invention.

FIG. 7 is a cross-sectional view of the pressure sensor 1 of the present embodiment. As shown in FIG. 7, in the present embodiment, the wirings 4 are constituted only with the embedded wiring 4e provided from the rear surface of the semiconductor substrate 3a and the bump 4d. The embedded wiring 4e reaches the gauge resistor 3c. Further, an epitaxial growth layer 20, formed on the surface of the semiconductor substrate 3a, is used as the protection cap 5. That is, the embedded wiring 4e, which is not extended to the surface of the semiconductor substrate 3a, is in contact with the gauge resistor 3c. Thus, the electric circuit including the gauge resistor 3c is also protected from the influence of the pressure medium by providing the epitaxial growth layer 20 on the surface of the semiconductor substrate 3a including the gauge resistor 3c. The epitaxial growth layer 20 has a conductivity type different from the gauge resistor 3c. That is, the epitaxial growth layer has the N conductive type when the gauge resistor 3c is a P type resistor, and the epitaxial growth layer has the P conductive type when the gauge resistor 3c is a N type resistor. Further, the inner wall insulation film 18 is formed on an inner wall of a hole, in which the embedded wiring 4e is to be formed. The embedded wiring 4e is embedded in the hole through the inner wall insulation film 18. Accordingly, the embedded wiring 4e is insulated from portions of the semiconductor substrate 3a other than the gauge resistor 3c.

In this structure, as corrosion of the surface pattern 4a by the pressure medium can be prevented, a similar advantage to that obtained in the first embodiment can be obtained. Note that in the structure of the present embodiment, the thickness of the epitaxial growth layer 20 is also added as the thickness of the diaphragm 3b. In this case, the amount of etching on the rear surface side of the semiconductor substrate 3a is controlled in consideration of the thickness of the epitaxial growth layer 20.

Here, the epitaxial growth layer 20 as a covering film for covering the surface of the semiconductor substrate 3a is formed. Alternatively, a silicon nitride film instead of the epitaxial growth layer 20 may be used as the covering film. Further, a silicon layer for bonding may be used as the covering film. When the silicon layer for bonding is used as the covering film, an oxide film is formed on the surface of the substrate 3a so as to protect the whole of the sensor chip 3, and then, the silicon layer for bonding is used through the oxide film. When the nitride film and the silicon layer and/or the oxide film are used for the covering film, the thickness of the oxide film is added into the thickness of the diaphragm 3b. In view of the thickness of the diaphragm 3b, the etching amount of the substrate 3a is controlled when the substrate 3a is etched from the backside of the substrate 3a.

Next, the manufacturing method of the pressure sensor 1 of the present embodiment will be described. FIGS. 8A to 8D are cross-sectional views showing the manufacturing processes of the pressure sensor 1 of the present embodiment.

Figure 8A:
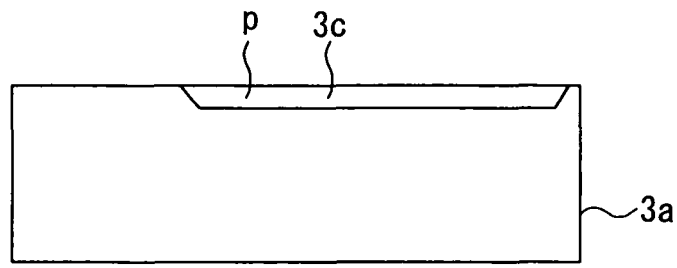
FIGS. 8A to 8D are cross-sectional views showing the manufacturing processes of the pressure sensor shown in FIG. 7.
Figure 8B:
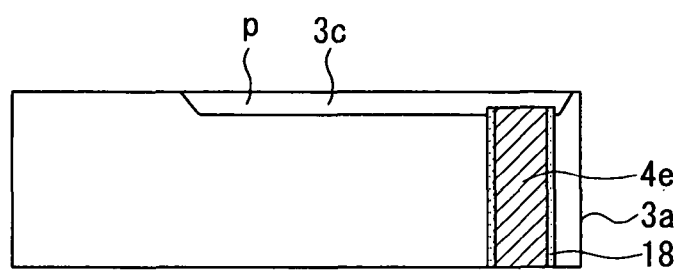

First, in FIG. 8A, the processes as shown in FIGS. 3A and 3B are performed. Note that in this embodiment, the gauge resistor 3c is extended to the outside of the diaphragm 3b. Next, in the process shown in FIG. 8C, the rear surface of the semiconductor substrate 3a is covered with a mask (not shown), then an opening is formed in the mask in a position corresponding to the embedded wiring 4e. Then, a hole which reaches the gauge resistor 3c is formed from the rear surface of the semiconductor substrate 3a by etching using the mask. Next, the mask is removed, and the inner wall insulation film 18 is formed in the hole by the thermal oxidation method or the deposition method. Further, Al or the like is deposited to fill the hole through the inner wall insulation film 18 in the rear surface of the semiconductor substrate 3a, and the Al is etched back such that the Al remains only in the hole. Thus the embedded wiring 4e of the wirings 4 is provided. If a heat treatment under a high temperature higher than 500° C. is performed after the embedded wiring 4e is formed, the embedded wiring 4e may be made of high melting point metal such as tungsten. Further, an insulation film such as SiO2 may be formed on the backside other than the contact hole, so that electric insulation property is improved. In this embodiment, before epitaxial growth, the hole is formed, and the inner wall insulation film 18 and the embedded wiring 4e are formed. Alternatively, the epitaxial growth layer 20 may be formed before the hole, the inner wall insulation film 18 and the embedded wiring 4e are formed. In this case, although Al has low melting point, Al is easily formed without any difficulty.

Figure 8C:
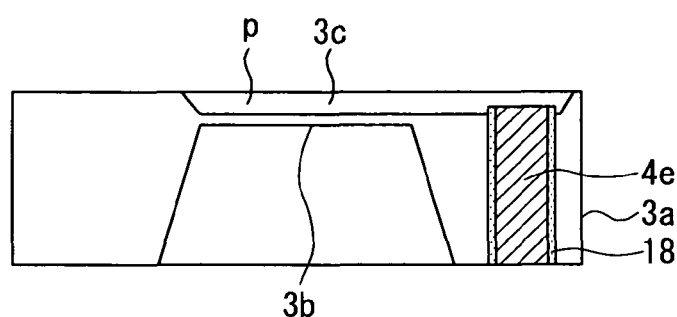
Figure 8D:
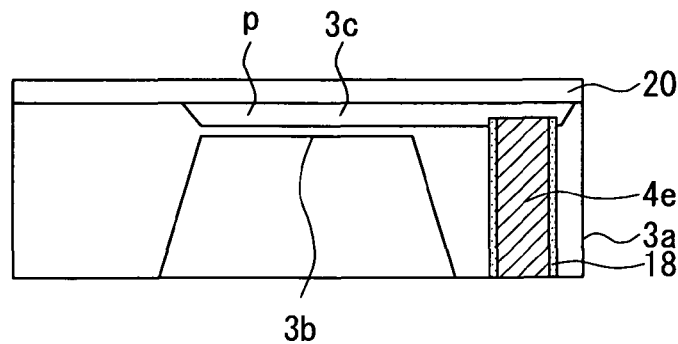

Thereafter, in FIG. 8C, the process as shown in FIG. 3C is performed. If necessary, a protection film similar to the oxide film 16 and the nitride film 17 may be formed on the gauge resistor 3c. In the process shown in FIG. 8D, the epitaxial growth layer 20 is formed by epitaxial-growing silicone on the surface of the semiconductor substrate 3a. Then, the protective material 8 is filled in the gap between the case 2 and the sensor chip 3 and the seal member 7. Then, the terminal 2c is connected through the bump 4d, and annealing is performed. Thereby the pressure sensor 1 as shown in FIG. 7 is completed.

Fourth Embodiment

Next, a fourth embodiment will be described. In the present embodiment, the structure of the seal member 7 is changed in the first embodiment. As the other elements are identical to those of the first embodiment, only the difference from the first embodiment will be described.

Figure 9:
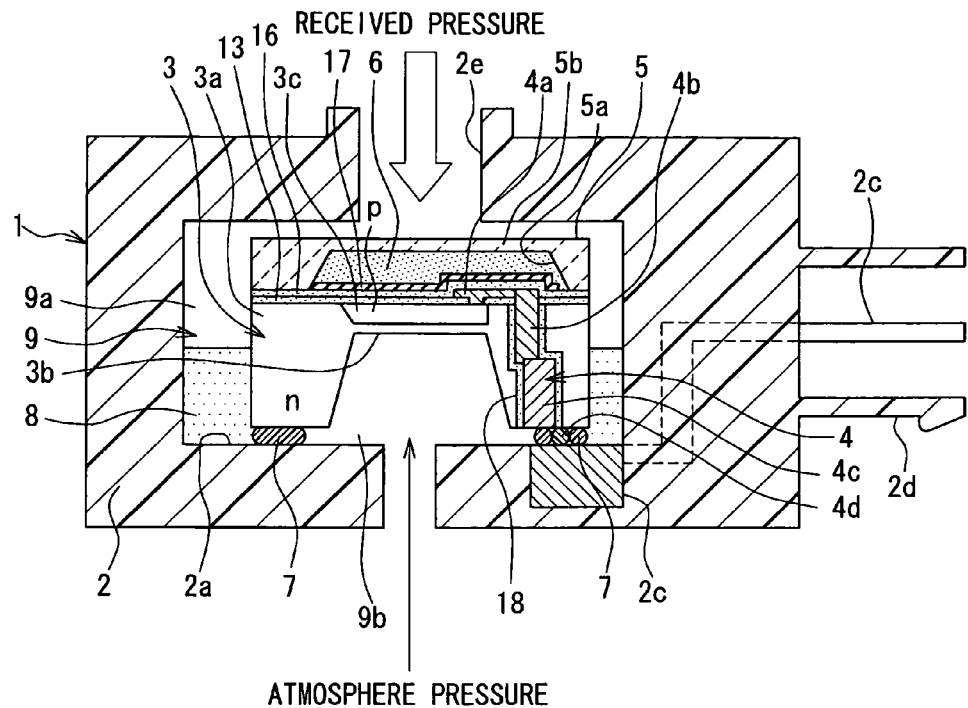
FIG. 9 is a cross-sectional view of a pressure sensor according to a fourth embodiment of the present invention.

FIG. 9 is a cross-sectional view of the pressure sensor 1 of the present embodiment. As shown in FIG. 9, in the present embodiment, the seal member 7 is constructed with one part, and the bump 4d is embedded inside the seal member 7. When the sensor chip 3 covered with the protection cap 5 is mounted on the mounting surface 2a of the case 2, the seal member 7 is crushed such that the bump 4d is brought into contact with the second embedded wiring 4c and the terminal 2c. In this manner, the seal member 7 can be constructed with one part.

Fifth Embodiment

Next, a fifth embodiment will be described. In the present embodiment, the structure of the first embodiment is applied to a pressure sensor for measurement of absolute pressure. As the other elements are identical to those of the first embodiment, only the difference from the first embodiment will be described.

Figure 10:
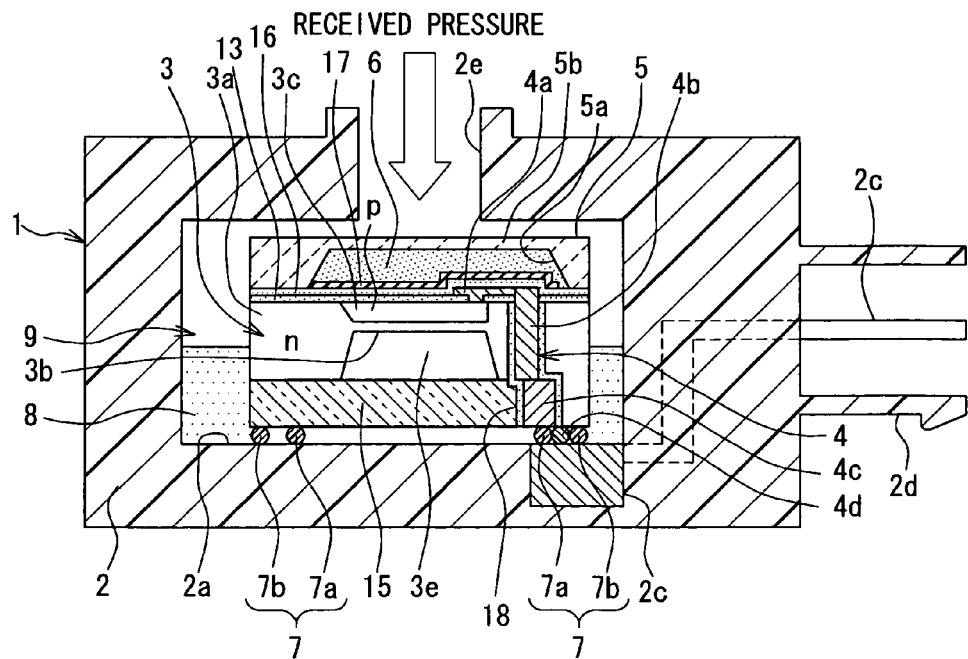
FIG. 10 is a cross-sectional view of a pressure sensor according to a fifth embodiment of the present invention.

FIG. 10 is a cross-sectional view of the pressure sensor of the present embodiment. As shown in FIG. 10, a seat 15 formed of glass, Si or the like is attached to the rear surface side of the semiconductor substrate 3a. A second hole is formed through the seat 15, and the second embedded wiring 4c is provided in the second hole through the inner wall insulation film 18. The seat 15 tightly closes the concavity formed on the rear surface side of the semiconductor substrate 3a, i.e., the concavity for formation of the diaphragm 3b, thereby a reference pressure chamber 3e is formed. Note that in the present embodiment, as the pressure sensor 1 is used for measurement of absolute pressure, the atmosphere introduction hole 2b (see FIG. 1) of the first embodiment is not formed.

The pressure sensor 1 of the present embodiment has the above structure. In this manner, the pressure sensor 1 may be used for measurement of absolute pressure, and a similar advantage to that obtained in the first embodiment can be obtained. Here, in FIG. 10, the seat 15 is made of silicon, the inner wall insulation film 18 is formed by the thermal oxidation method. Alternatively, the seat 15 may be made of glass, and the inner wall insulation film 18 may be formed by other methods such as the deposition method. In this case, the sidewall of the first hole and the side wall of the second hole are not oxidized by the thermal oxidation. Thus, the inner wall insulation film 18 is formed on the inner wall of the first and second holes.

Sixth Embodiment

Next, a sixth embodiment will be described. In the present embodiment, the pressure sensor 1 having the structure described in the second embodiment is used for measurement of absolute pressure as in the case of the fifth embodiment. Further, the sealing structure and the structure for electric connection with the outside are changed. As the other elements are identical to those of the second and fifth embodiments, only the difference from the second and fifth embodiments will be described.

Figure 11A:
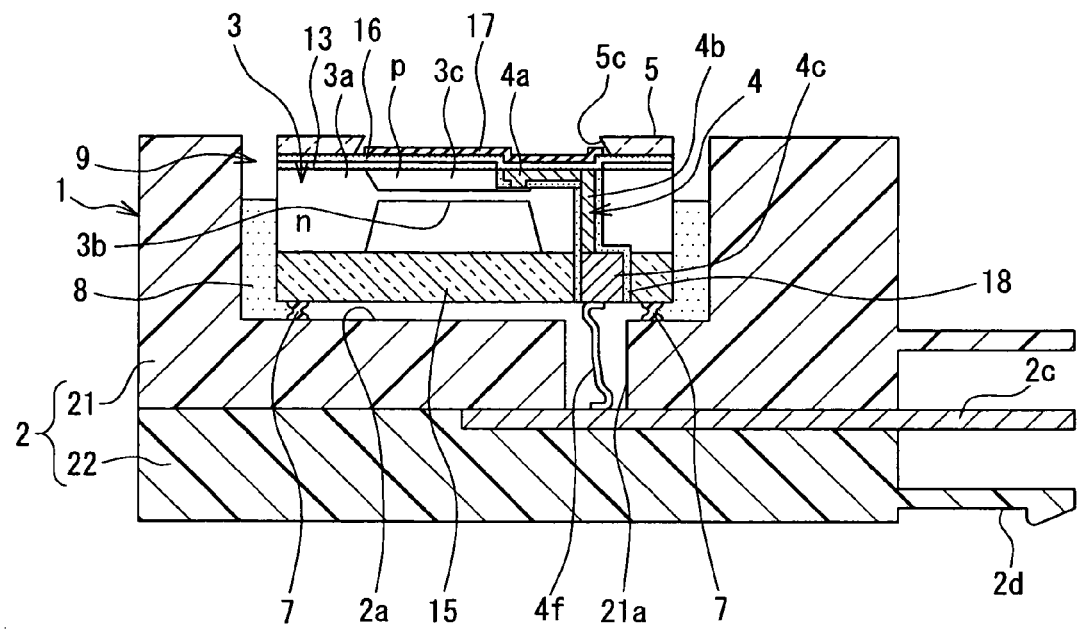
FIG. 11A is a cross-sectional view (along a line XIA-XIA in FIG. 11B) showing a schematic structure of a pressure sensor according to a sixth embodiment of the present invention.
Figure 11B:
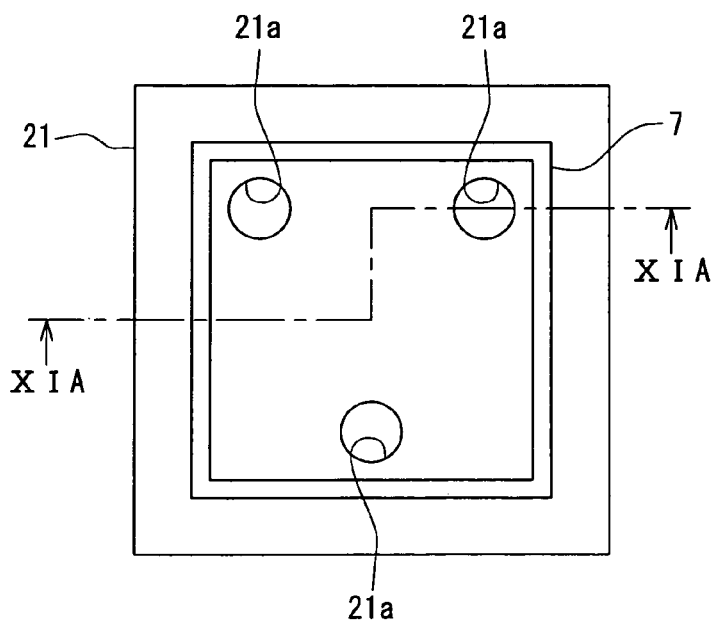
FIG. 11B is a front view showing a layout of the pressure sensor.

FIGS. 11A and 11B show a schematic structure of the pressure sensor 1 of the present embodiment. FIG. 11A is a cross-sectional view of the pressure sensor 1 (corresponding to a XIA-XIA cross section in FIG. 11B). FIG. 11B is a front view showing the layout of the pressure sensor 1.

As shown in FIG. 11A, the case 2 has an upper case 21 forming the space 9 to accommodate the sensor chip 3 and the seat 15 and a lower case 22 provided with the terminal 2c. Regarding the structures of the sensor chip 3 and the seat 15, since the seat 15 shown in the fifth embodiment is attached to the rear surface of the sensor chip 3 shown in the second embodiment, there is no particular difference. The difference is that a hole 21a is formed in the mounting surface 2a of the upper case 21 in correspondence with the second embedded wiring 4c. A part of the terminal 2c is exposed through the hole 21a, thereby the electric connection between the second embedded wiring 4c and the terminal 2c is established, and all the second embedded wiring 4c is surrounded with one seal member 7 provided between the rear surface of the seat 15 and the mounting surface 2a of the upper case 21.

As shown in FIG. 11B, the hole 21a is formed in plural positions in correspondence with a number necessary for connection with the outside. In FIG. 11B, three holes 21a are provided for power source supply, ground and sensor output.

The arrangement of the hole 21a in FIG. 11B is merely an example, and the number of the holes 21a may be less than three or more than three.

In the terminal 2c, a portion electrically connected with at least the second embedded wiring 4c is exposed from the surface of the lower case 22. When the upper case 21 and the lower case 22 are joined with each other, the respective portions of the terminal 2c joined to the second embedded wiring 4c are positioned in the respective holes 21a formed in the upper case 21. The electric connection between the terminal 2c and the second embedded wiring 4c is established with a junction member 4f which is formed of a bonding wire, resin-coated wiring or conductive spring member and which forms a part of the wirings 4. When the junction member 4f is formed of a bonding wire, the second embedded wiring 4c is bonded to the terminal 2c before the upper case 21 and the lower case 22 are attached to each other. When the junction member 4f is formed of a resin-coated wiring, the wiring is bonded by using a bump or solder to the second embedded wiring 4c and the terminal 2c before the upper case 21 and the lower case 22 are attached to each other. When the junction member 4f is formed of a conductive spring member, the upper case 21 and the lower case 22 are joined with each other while the conductive spring member is elastically deformed between the second embedded wiring 4c and the terminal 2c. Note that the upper case 1 and the lower case 22 may be joined with each other via e.g. adhesive.

In this manner, the holes 21a for external connection are formed in the mounting surface 2a of the upper case 21, and the second embedded wiring 4c and the terminal 2c are electrically connected through the holes 21a. In this structure, a similar advantage to that obtained in the first embodiment can be obtained.

Seventh Embodiment

Next, a seventh embodiment will be described. In the present embodiment, the structure of the seal member 7 is changed in the sixth embodiment. As the other elements are identical to those of the sixth embodiment, only the difference from the sixth embodiment will be described.

Figure 12A:
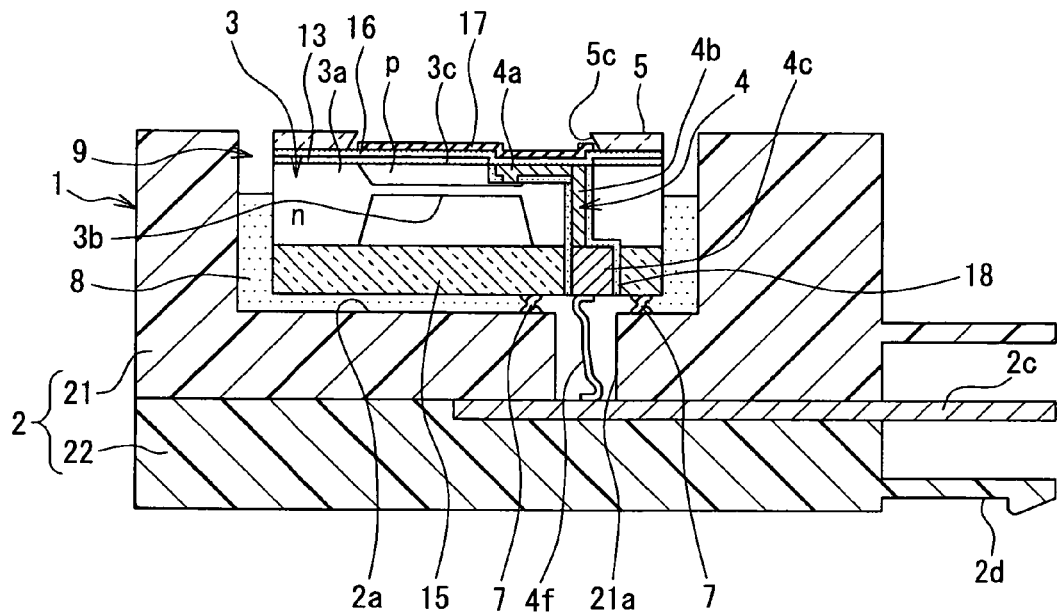
FIG. 12A is a cross-sectional view (along a line XIIA-XIIA in FIG. 12B) showing a schematic structure of a pressure sensor according to a seventh embodiment of the present invention.
Figure 12B:
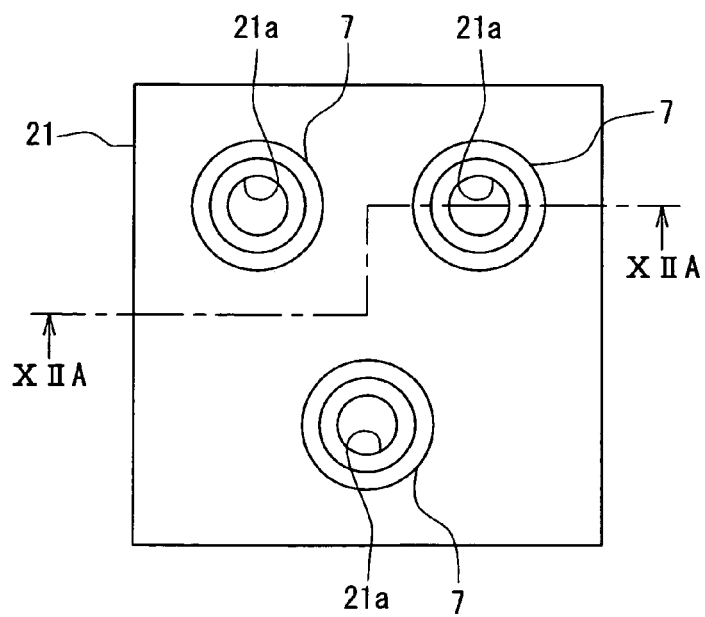
FIG. 12B is a front view showing a layout of the pressure sensor.

FIGS. 12A and 12B show a schematic structure of the pressure sensor 1 of the present embodiment. FIG. 12A is a cross-sectional view of the pressure sensor 1 (corresponding to a XIIA-XIIA cross section in FIG. 12B). FIG. 12B is a front view showing the layout of the pressure sensor 1.

As shown in FIGS. 12A and 12B, in the present embodiment, the seal member 7 is provided in correspondence with the number of the holes 21a. Each hole 21a is surrounded with one seal member 7 thereby each hole 21a is sealed.

In this manner, in the structure where one hole 21a is sealed with one seal member 7, a similar advantage to that obtained in the sixth embodiment can be obtained.

Eighth Embodiment

Next, an eighth embodiment will be described. In the present embodiment, the structure of the seal member 7 is changed in the sixth embodiment. As the other elements are identical to those of the sixth embodiment, only the difference from the sixth embodiment will be described.

Figure 13A:
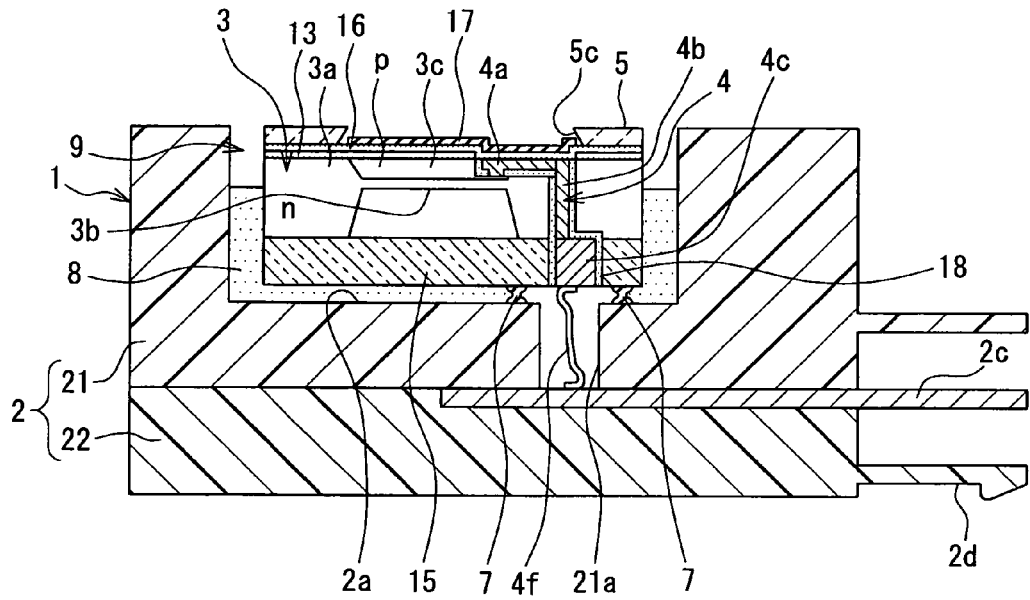
FIG. 13A is a cross-sectional view (along a line XIIIA-XIIIA in FIG. 13B) showing a schematic structure of a pressure sensor according to an eighth embodiment of the present invention.
Figure 13B:
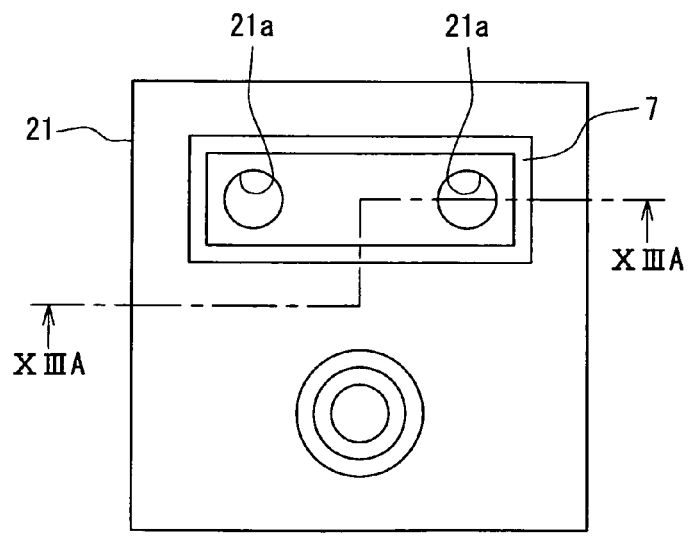
FIG. 13B is a front view showing a layout of the pressure sensor.

FIGS. 13A and 13B show a schematic structure of the pressure sensor 1 of the present embodiment. FIG. 13A is a cross-sectional view of the pressure sensor 1 (corresponding to a XIIIA-XIIIA cross section in FIG. 13B). FIG. 13B is a front view showing the layout of the pressure sensor 1.

As shown in FIGS. 13A and 13B, in the present embodiment, the seal member 7 is provided in plural positions, however, the number of the seal members 7 is smaller than that of the holes 21a. One or plural holes 21a are surrounded with one seal member 7.

In this manner, in the structure where one seal member 7 seals one or plural holes 21a, a similar advantage to that obtained in the sixth embodiment can be obtained.

Ninth Embodiment

Next, a ninth embodiment will be described. In the present embodiment, the seal member 7 is not employed in the sixth embodiment. As the other elements are identical to those of the sixth embodiment, only the difference from the sixth embodiment will be described.

Figure 14:
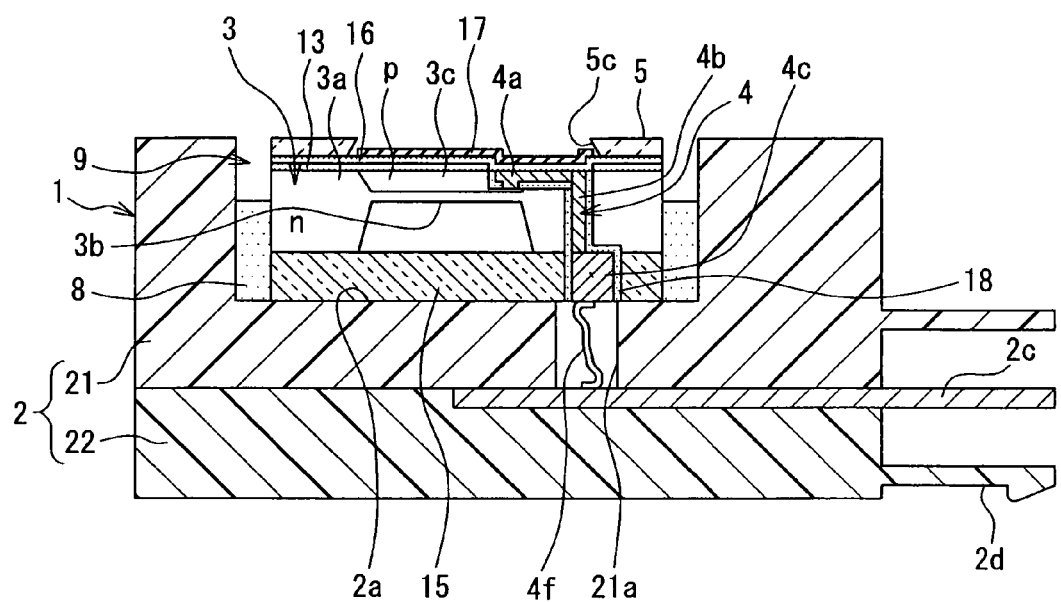
FIG. 14 is a cross-sectional view of a pressure sensor according to a ninth embodiment of the present invention.

FIG. 14 is a cross-sectional view of the pressure sensor 1 of the present embodiment. As shown in FIG. 14, the rear surface of the seat 15 is in direct contact with the mounting surface 2a of the upper case 21. As the rear surface of the seat 15 is flat, the seat 15 is brought into tight contact with the mounting surface 2a of the upper case 21 when the seat 15 is placed on the mounting surface 2a. When the seat 15 is formed of Si, it is preferable to coat the seat 15 with an insulating film or the like so as to enhance adhesion. The pressure sensor 1 having the above structure is manufactured by joining the seat 15 with the sensor chip 3 then filling the protective material 8 in the space 9 of the upper case 21 while the rear surface of the seat 15 is in tight contact with the mounting surface 2a of the upper case 21. For example, the protective material 8 is filled in a status where the sensor chip 3 and the seat 15 are sucked through the holes 21a. The suction is not preferable in the case of the structure for measurement of relative pressure since the diaphragm is directly sucked. However, in the case of the structure for measurement of absolute pressure, as the diaphragm is not directly sucked, there is no problem in the suction.

In this manner, in the structure where the rear surface of the seat 15 is in direct contact with the mounting surface 2a of the upper case 21, a similar advantage to that obtained in the sixth embodiment can be obtained.

Tenth Embodiment

Next, a tenth embodiment will be described. In the present embodiment, the manufacturing method of the sensor chip 3 is different from that in the first and second embodiments. As the other manufacturing method are identical to those of the first and second embodiments, only the difference from the first and second embodiments will be described.

In the first and second embodiments, when the sensor chip 3 is formed, the first and second embedded wirings 4b, 4c of the wiring 4 are formed after the diaphragm 3b is formed. In the present embodiment, the first and second embedded wirings 4b, 4c of the wiring 4 are formed before the diaphragm 3b is formed. The pressure sensor 1 shown in FIG. 1 as an example sensor is manufactured by the manufacturing method of the present embodiment. FIGS. 15A to 15E and 16A to 16C show the manufacturing method of the present embodiment.

Figure 15A:
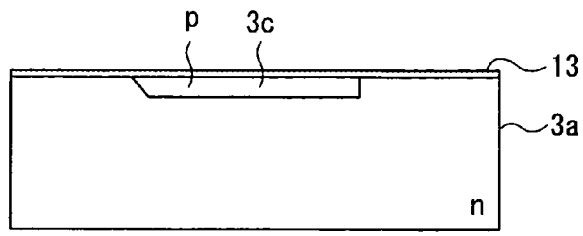
FIGS. 15A to 15E are cross-sectional views showing a manufacturing processes of a pressure sensor according to a tenth embodiment of the present invention.
Figure 15B:
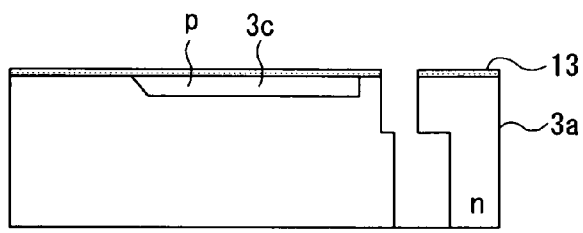
Figure 15C:
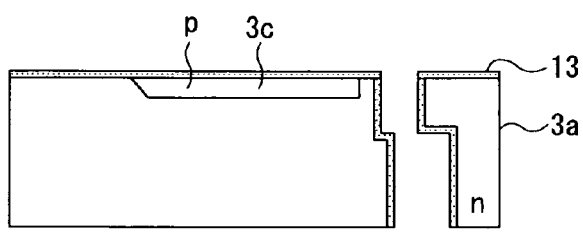
Figure 15D:
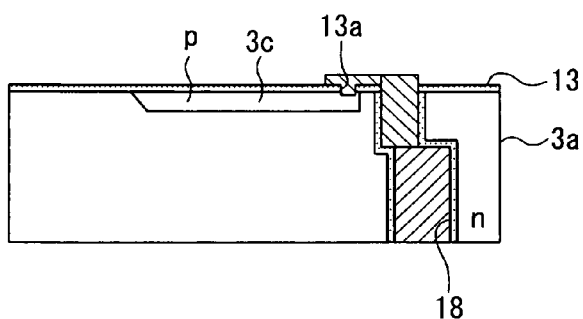

In the step shown in FIG. 15A, the silicon oxide film 13 is formed on the substrate 3a, and the gauge resistor 3c is formed, according to the steps shown in FIGS. 3A and 3B. In the step shown in FIG. 15B, a mask (not shown) is formed on the surface of the silicon oxide film 13. Then, a part of the mask corresponding to the first hole is opened. Then, by using the mask, the first hole is formed in the semiconductor substrate 3a from the surface of the silicon oxide film 13 by the etching method. Thus, the first and second holes are formed as a through hole for penetrating the substrate 3a.

in the step shown in FIG. 15C, the mask for forming the first and second holes is removed. Then, the inner wall insulation film 18 is formed on the inner wall of the first and second holes by the thermal oxidation method or the deposition method. Then, in the step shown in FIG. 15D, the silicon oxide film 13 is partially removed by using a mask (not shown) so that the gauge resistor 3c is partially exposed from the silicon oxide film 13. Thus, the contact hole 13a is formed. Then, a metal layer such as an Al layer is partially inserted into the holes from the surface side and backside of the substrate 3a, so that the first and second embedded wirings 4b, 4c are embedded in the hole through the inner wall insulation film 18. Then, another metal layer such as an Al layer is formed on the surface of the substrate 3a, and then, the metal layer is patterned. Thus, the surface pattern 4a is formed. The surface pattern 4a is electrically coupled with the gauge resistor 3c through the contact hole 13a. Further, the surface pattern 4a couples the first and second embedded wirings 4b, 4c and the gauge resistor 3c.

Figure 15E:
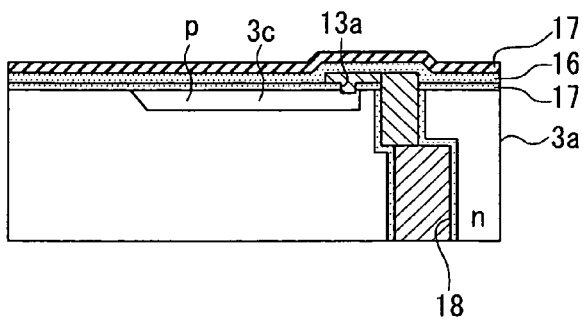

In the step shown in FIG. 15E, the whole surface of the substrate 3a including the gauge resistor 3c and the surface pattern 4a is covered with the protection film composed of the oxide film 16 and the nitride film 17. The protection film may be composed of at least one of the oxide film 16 and the nitride film 17. It is not necessary to form both of the oxide film 16 and the nitride film 17.

Figure 16A:
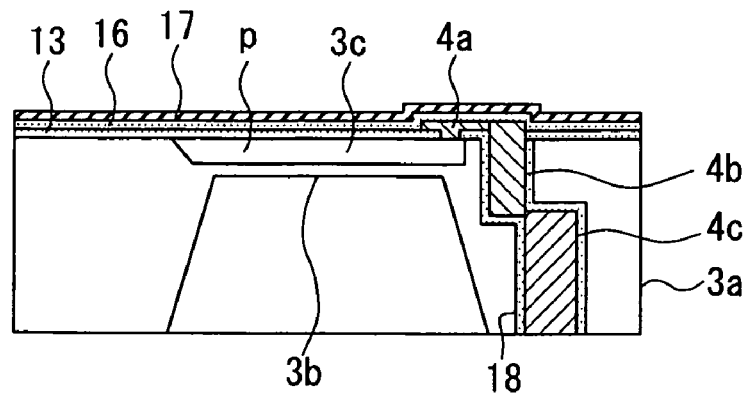
FIGS. 16A and 16C are cross-sectional views showing the manufacturing processes of the pressure sensor subsequent to FIGS. 15A to 15E.

In the step shown in FIG. 16A, a mask (not shown) is formed on the backside of the substrate 3a. Then, a part of the mask corresponding to a diaphragm-to-be-formed region is opened by the photo etching method. By using the mask, the backside of the substrate 3a is dented so that the diaphragm 3b is formed. Then, the mask is removed, and the sensor chip 3 is completed.

Figure 16B:
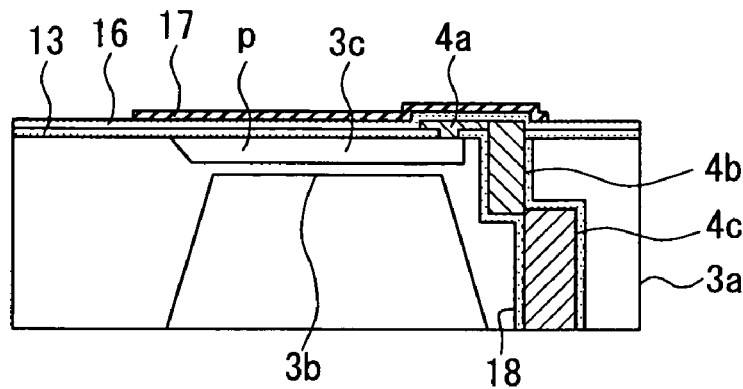
Figure 16C:
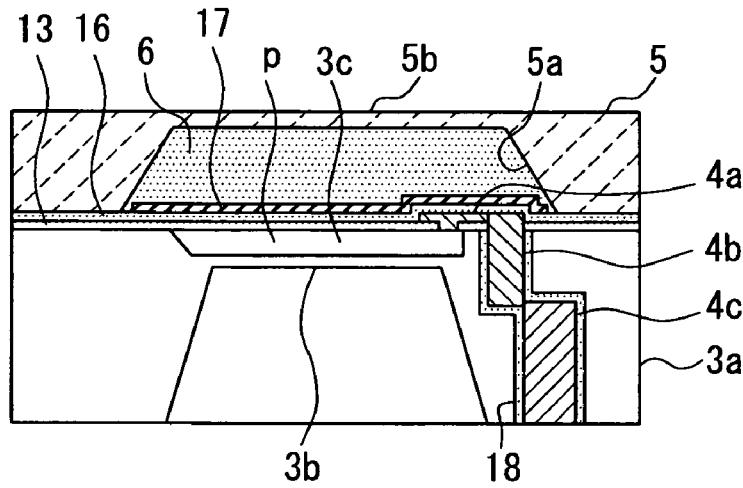
Figure 17:
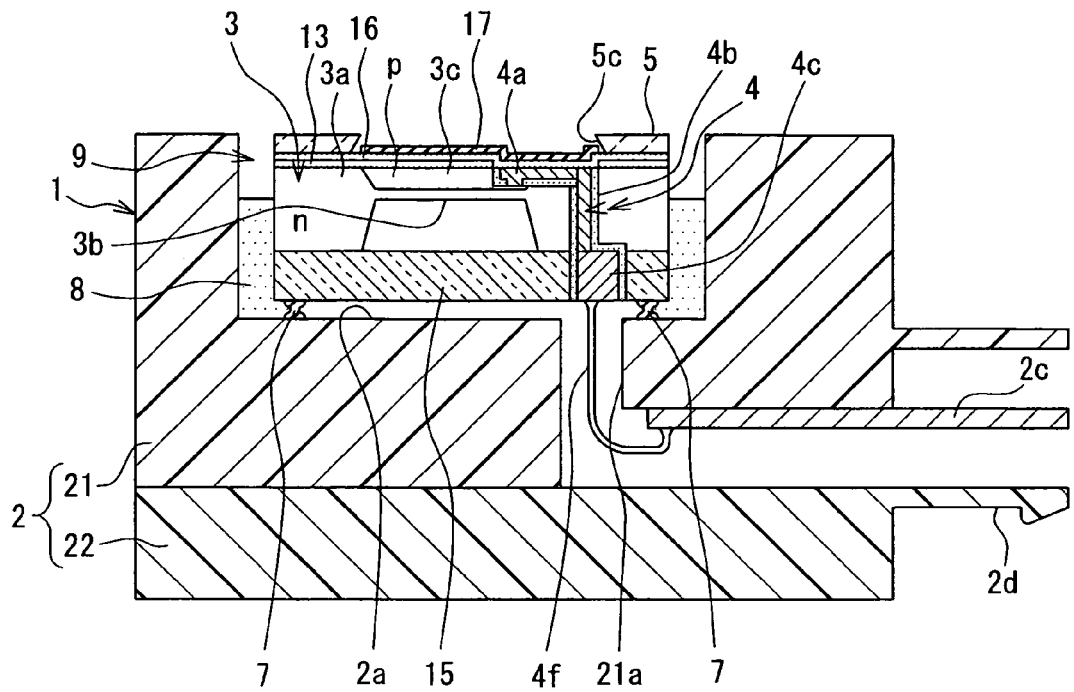
FIG. 17 is a cross-sectional view of a pressure sensor according to another embodiment of the present invention.

In the step shown in FIG. 16B, a part of the protection film that is the outer periphery region of the nitride film 17 corresponding to a region contacting the protection cap 5, is removed. In the step shown in FIG. 16C, the protection cap 5 is bonded to the surface of the oxide film 16, which is exposed from the nitride film 17. At this time, the oxide film 16 functions as the connection intermediate layer, so that the protection cap 5 is easily bonded to the substrate 3a. Further, when the protection cap 5 is bonded to the substrate 3a in a certain chamber (not shown), in which hydrogen gas and/or noble gas fills, the pressure transmission medium composed of the hydrogen gas and/or the noble gas is charged between the protection cap 5 and the substrate 3a. Further, when the backside of the protection cap 5 turns up, liquid is filled in the concavity 5a so that the liquid provides the pressure transmission medium.

Thus, before the diaphragm 3b is formed, the first and second embedded wirings 4b, 4c can be formed. By performing in this order, the first and second embedded wirings 4b, 4c are formed without the diaphragm 3b. Therefore, in the step of forming the first and second embedded wirings 4b, 4c, since the diaphragm 3b is not disposed in the sensor 1, the diaphragm 3b is not damaged.

Although the sensor 1 shown in FIG. 1 is manufactured by the manufacturing method according to the present embodiment, the sensor 1 according to the second embodiment or other embodiments can be manufactured by the present manufacturing method.

Other Embodiments

In the above-described embodiments, the electric connection between the second embedded wiring 4c exposed from the rear surface of the sensor chip 3 or the embedded wiring 4e and the terminal 2c exposed from the mounting surface 2a of the case 2 is established by using the bump 4d. However, other conductive joint member than the bump such as a conductive adhesive may be employed for the above electric connection.

Further, in the fourth embodiment, the seal member 7 is changed in the first embodiment, however, the seal member 7 may be changed in the second and third embodiments.

Further, in the above-described sixth to eighth embodiments, the electric connection between the second embedded wiring 4c and the terminal 2c is established via the joint member 4f. It may be arranged such that the terminal 2c is bend-processed, then a joint member is formed using the bend-processed portion, thereby the bend-processed portion (joint member) is electrically connected with the second embedded wiring 4c when the upper case 21 and the lower case 22 are joined with each other.

Further, in the above-described sixth to ninth embodiments, when the sensor chip 3 having the structure of the second embodiment is used in the pressure sensor 1 for measurement of absolute pressure, the structures of the respective embodiments are adopted. The structures of the sixth to ninth embodiments may be adopted for the structures of the first embodiment (i.e., the fifth embodiment) and the third embodiment.

Further, in the above-described sixth to ninth embodiments, the electric connection between the terminal 2c and the embedded wiring 4c is established by using the joint member 4f. When the joint member 4f is a bonding wire, it is preferable that the structure is made such that the bonding is easily performed. For this purpose, for example, as shown in a cross-sectional view of FIG. 15, the terminal 2c is exposed on the lower surface of the upper case 21, and bonding is performed from the same direction on the surfaces of the second embedded wiring 4c and the surface of the terminal 2c. This facilitates electric connection by bonding.

Figure 18:
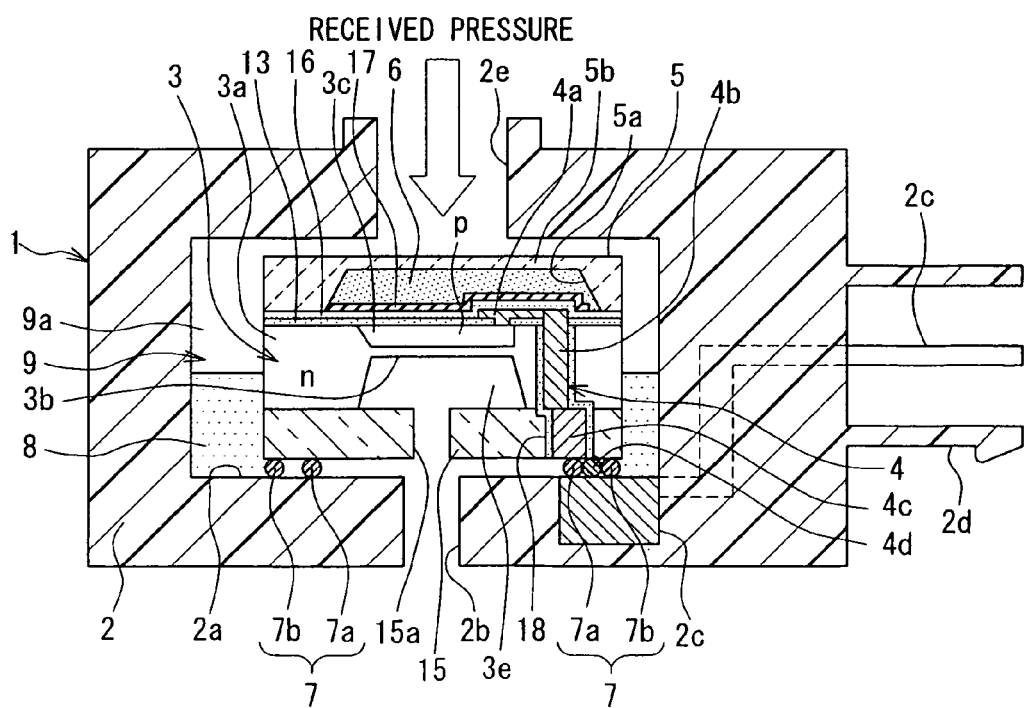
FIG. 18 is a cross-sectional view of a pressure sensor according to further another embodiment of the present invention.

In the sixth to ninth embodiments, the seat 15 is used for the pressure sensor 1 as an absolute pressure sensor. Alternatively, the seat 15 may be used for the pressure sensor 1 as a relative pressure sensor according to the first embodiment. FIG. 18 shows a relative pressure sensor by using the structure according to the sixth embodiment. The atmospheric pressure hole 15a penetrating the seat 15 is formed, and the atmospheric pressure introduction hole 2b is also formed in the case 2. Thus, the atmospheric pressure is introduced to the back side of the diaphragm 3b through the atmospheric pressure hole 15a and the atmospheric pressure introduction hole 2b. Thus, the relative pressure sensor is formed. Alternatively, the sensor according to the seventh to ninth embodiments may be formed as a relative pressure sensor.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are pre-

The invention claimed is:

1. A pressure sensor for detecting pressure of a pressure medium comprising:
   a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor) is disposed on the first diaphragm;
   a protection cap covering the first diaphragm and bonded to the first side of the semiconductor substrate;
   a case including a hollow portion for accommodating the sensor chip with the protection cap and a mounting surface for mounting the sensor chip, wherein the case introduces the pressure medium to a pressure receiving surface of the protection cap, and introduces atmospheric air to the second side of the semiconductor substrate;
   a terminal electrically coupling between the sensor chip and an external circuit;
   a wiring electrically coupling between the gauge resistor and the terminal; and
   a seal member having a ring shape, wherein
   when the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit,
   the wiring includes an embedded portion and a connection portion,
   the embedded portion is embedded in the hole of the semiconductor substrate through an inner wall insulation film so that the embedded portion is insulated from the semiconductor substrate with the inner wall insulation film, and electrically coupled with the gauge resistor,
   the connection portion is disposed between a part of the embedded portion and a part of the terminal so that the connection portion electrically couples between the embedded portion and the terminal, the part of the embedded portion exposed from the second surface of the semiconductor substrate and the part of the terminal exposed from the mounting surface of the case,
   the embedded portion is covered with the protection cap so that the embedded portion is isolated from the pressure medium,
   the seal member is disposed between the mounting surface of the case and the second side of the semiconductor substrate,
   the hollow portion includes a first hollow portion and a second hollow portion,
   the pressure medium is introduced into the first hollow portion, and the atmospheric air is introduced into the second hollow portion,
   the seal member separates the first hollow portion from the second hollow portion so that pressure difference between the first and second hollow portions is maintained, and
   the seal member isolates the connection portion from the pressure medium and the atmospheric air.

2. The pressure sensor according to claim 1, wherein
   the wiring further includes a surface portion disposed on the first side of the semiconductor substrate through an interlayer insulation film,
   the embedded portion is electrically coupled with the surface portion,
   the surface portion is covered with at least one of an oxide film or a nitride film,
   the interlayer insulation film includes a contact hole, and
   the surface portion is disposed in the contact hole so that the surface portion is electrically coupled with the gauge resistor through the contact hole.

3. The pressure sensor according to claim 1, further comprising:
   a pressure transmission medium for transmitting the force from the protection cap to the first diaphragm, wherein
   the protection cap includes a second concavity facing the semiconductor substrate so that the second concavity provides a thin portion as a second diaphragm,
   the second concavity covers the first diaphragm,
   the pressure transmission medium is disposed between the second diaphragm and the first side of the semiconductor substrate,
   the second diaphragm of the protection cap is deformable according to the pressure of the pressure medium, and
   a force corresponding to distortion of the protection cap transmits from the protection cap to the first diaphragm through the pressure transmission medium.

4. The pressure sensor according to claim 1, wherein
   the embedded portion does not reach the first side of the substrate,
   the protection cap is an epitaxial growth layer or a silicon nitride covering film, which is disposed on the first side of the substrate, and
   the epitaxial growth layer has a N conductive type in case of a P type gauge resistor or has a p conductive type in case of a N type gauge resistor.

5. The pressure sensor according to claim 1, wherein
   the protection cap is bonded to the semiconductor substrate through a connection layer made of an oxide film or a metallic film.

6. The pressure sensor according to claim 1, wherein
   the seal member includes a first seam member and a second seal member,
   the second seal member surrounds the first seal member, and
   the connection portion is disposed between the first and second seal members.

7. The pressure sensor according to claim 6, wherein the case further includes an air introduction port on the mounting surface, the air introduction port introduces the atmospheric air into the hollow portion, and
   the first seam member surrounds the air introduction port.

8. The pressure sensor according to claim 1, wherein
   the seal member is provided by only one ring, and
   the connection portion includes a bump, which is embedded in the one ring.

9. The pressure sensor according to claim 8, wherein
   the case further includes an air introduction port on the mounting surface,
   the air introduction port introduces the atmospheric air into the hollow portion, and
   the seal member is disposed on both sides of the bump.

10. The pressure sensor according to claim 1, further comprising:
a protection member disposed in the hollow portion among the case, the sensor chip and the seal member so that the protection member protects the seal element.

11. A pressure sensor for detecting pressure of a pressure medium comprising:
a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor is disposed on the first diaphragm;
a base having a plate shape and bonded to the second side of the semiconductor substrate, wherein the base further includes a first through hole;
a protection cap covering the first diaphragm and bonded to the first side of the semiconductor substrate;
a case including a hollow portion for accommodating the sensor chip with the protection cap and the base and a mounting surface for mounting the sensor chip, wherein the case introduces the pressure medium to a pressure receiving surface of the protection cap;
a terminal electrically coupling between the sensor chip and an external circuit;
a wiring electrically coupling between the gauge resistor and the terminal; and
a seal member having a ring shape, wherein
when the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit,
the wiring includes an embedded portion and a connection portion,
the embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor,
the connection portion is disposed between a part of the embedded portion and a part of the terminal so that the connection portion couples between the embedded portion and the terminal, the part of the embedded portion exposed from the second surface of the semiconductor substrate and the part of the terminal exposed from the mounting surface of the case,
the embedded portion is covered with the protection cap so that the embedded portion is isolated from the pressure medium,
the seal member is disposed between the mounting surface of the case and the base,
the pressure medium is introduced into the hollow portion, and
the hollow portion is separated from the connection portion by the seal member so that the seal member isolates the connection portion from the pressure medium.

12. A pressure sensor for detecting pressure of a pressure medium comprising:
a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, and wherein the gauge resistor is disposed on the first diaphragm;
a base having a plate shape and bonded to the second side of the semiconductor substrate, wherein the base further includes a first through hole;
a protection cap covering the first diaphragm and bonded to the first side of the semiconductor substrate;
a case including a hollow portion for accommodating the sensor chip with the protection cap and the base and a mounting surface for mounting the sensor chip, wherein the case introduces the pressure medium to a pressure receiving surface of the protection cap;
a terminal electrically coupling between the sensor chip and an external circuit; and
a wiring electrically coupling between the gauge resistor and the terminal, wherein
when the protection cap is distorted according to the pressure of the pressure medium introduced to the pressure receiving surface, a force corresponding to distortion of the protection cap transmits from the protection cap to the first diaphragm, a resistance of the gauge resistor is changed, and a detection signal corresponding to a resistance change is output through the wiring and the terminal to the external circuit,
the wiring includes an embedded portion,
the embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically coupled with the gauge resistor,
the embedded portion is covered with the protection cap so that the embedded portion is isolated from the pressure medium,
the base directly contacts the mounting surface of the case so that the embedded portion is directly coupled with the terminal,
the pressure medium is introduced into the hollow portion, and
a connection portion between the embedded portion and the terminal is isolated from the hollow portion.

13. The pressure sensor according to claim 3, wherein
the case includes a first case and a second case,
the first case provides the hollow portion and the mounting surface,
the second case is disposed on the first case and opposite to the sensor chip,
the terminal is embedded in the second case,
the first case includes a second hole corresponding to the embedded portion, of the wiring,
the terminal is exposed through the second hole, and
the connection portion is disposed in the second hole so that the embedded portion is electrically coupled with the terminal through the connection portion.

14. The pressure sensor according to claim 13, wherein
the wiring includes a plurality of wiring elements,
the second hole includes a plurality of hole portion, each of which corresponds to a respective wiring element, and
the seal member surrounds all hole portions.

15. The pressure sensor according to claim 13, wherein
the wiring includes a plurality of wiring elements,
the second hole includes a plurality of hole portion, each of which corresponds to a respective wiring elements,
the seal member surrounds all hole portions,
the seal member includes a plurality of seal elements, each of which corresponds to a respective hole portion, and
each seal element surrounds a respective hole portion.

16. The pressure sensor according to claim 13, wherein
the wiring includes a plurality of wiring elements,
the second hole includes a plurality of hole portion, each of which corresponds to a respective wiring element,
the seal member includes a plurality of seal elements,
the number of the seal elements is smaller than the number of the hole portions, and
one of the seal elements surround two or more hole portions.

17. A pressure sensor for detecting pressure of a pressure medium comprising:
a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side;
a protection cap bonded to the first side of the semiconductor substrate, wherein the protection is disposed on a periphery of the first diaphragm, and wherein the protection cap includes a second through hole corresponding to the first diaphragm;
a case including a hollow portion for accommodating the sensor chip with the protection cap and a mounting surface for mounting the sensor chip, wherein the case introduces the pressure medium to a pressure receiving surface of the first diaphragm, and introduces atmospheric air to the second side of the semiconductor substrate;
a terminal electrically coupling between the sensor chip and an external circuit;
a wiring electrically coupling between the gauge resistor and the terminal; and
a seal member having a ring shape, wherein
when the first diaphragm is distorted according to the pressure of the pressure medium introduced to the pressure receiving surface, a resistance of the gauge resistor is changed, and a detection signal corresponding to a resistance change is output through the wiring and the terminal to the external circuit,
the wiring includes an embedded portion and a connection portion,
the embedded portion is embedded in the hole of the semiconductor substrate through the inner wall insulation film so that the embedded portion is insulated from the semiconductor substrate with the inner wall insulation film, and electrically coupled with the gauge resistor,
the connection portion is disposed between a part of the embedded portion and a part of the terminal so that the connection portion couples between the embedded portion and the terminal, the part of the embedded portion exposed from the second surface of the semiconductor substrate and the part of the terminal exposed from the mounting surface of the case,
the embedded portion is covered with the protection cap so that the embedded portion is isolated from the pressure medium,
the seal member is disposed between the mounting surface of the case and the second side of the semiconductor substrate,
the hollow portion includes a first hollow portion and a second hollow portion,
the pressure medium is introduced into the first hollow portion, and the atmospheric air is introduced into the second hollow portion,
the seam member separates the first hollow portion from the second hollow portion so that pressure difference between the first and second hollow portions is maintained, and
the seal member isolates the connection portion from the pressure medium and the atmospheric air.

18. The pressure sensor according to claim 17, wherein
the wiring further includes a surface portion disposed in a concavity of the gauge resistor through the inner wall insulation film,
the embedded portion is electrically coupled with the surface portion,
the surface portion is covered with at least one of an oxide film or a nitride film,
the inner wall insulation film includes a contact hole, and
the surface portion is disposed in the contact hole so that the surface portion is electrically coupled with the gauge resistor through the contact hole.

19. A pressure sensor for detecting pressure of a pressure medium comprising:
a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side;
a base having a plate shape and bonded to the second side of the semiconductor substrate, wherein the base further includes a first through hole;
a protection cap bonded to the first side of the semiconductor substrate, wherein the protection cap is disposed on a periphery of the first diaphragm and wherein the protection cap includes a second through hole corresponding to the first diaphragm;
a case including a hollow portion for accommodating the sensor chip with the protection cap and the base and a mounting surface for mounting the sensor chip, wherein the case introduces the pressure medium to a pressure receiving surface of the first diaphragm;
a terminal electrically coupling between the sensor chip and an external circuit;
a wiring electrically coupling between the gauge resistor and the terminal; and
a seal member having a ring shape, wherein
when the first diaphragm is distorted according to the pressure of the pressure medium introduced to the pressure receiving surface, a resistance of the gauge resistor is changed, and a detection signal corresponding to a resistance change is output through the wiring and the terminal to the external circuit,
the wiring includes an embedded portion and a connection portion, the embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and the electrically coupled with the gauge resistor, the connection portion is disposed between a part of the embedded portion and a part of the terminal so that the connection portion is coupled between the embedded portion and the terminal, the part of the embedded portion exposed from the second surface of the semiconductor substrate and the part of the terminal exposed from the mounting surface of the case, the embedded portion is covered with the protection cap so that the embedded portion is isolated from the pressure medium, the seal member is disposed between the mounting surface of the case and the base, the pressure medium is introduced into the hollow portion, and the hollow portion is separated from the connection portion by the seal member so that the seal member isolates the connection portion from the pressure medium.

20. A pressure sensor for detecting pressure of a pressure medium comprising:

a sensor chip including a semiconductor substrate, a first diaphragm and a gauge resistor, wherein the semiconductor substrate has first and second sides, wherein the semiconductor substrate further includes a first concavity on the second side and a hole disposed on the second side, wherein the first concavity provides a thin portion as the first diaphragm, wherein the gauge resistor is disposed on the first diaphragm, and wherein the hole of the substrate penetrates the substrate from the first side to the second side;

a base having a plate shape and bonded to the second side of the semiconductor substrate, wherein the base further includes a first through hole;

a protection cap bonded to the first side of the semiconductor substrate, wherein the protection cap is disposed on a periphery of the first diaphragm, and wherein the protection cap includes a second through hole corresponding to the first diaphragm;

a case including a hollow portion for accommodating the sensor chip with the protection cap and the base and a mounting surface for mounting the sensor chip, wherein the case introduces the pressure medium to a pressure receiving surface of the first diaphragm;

a terminal electrically coupling between the sensor chip and an external circuit; and a wiring electrically coupling between the gauge resistor and the terminal, wherein when the first diaphragm is distorted according to the pressure of the pressure medium introduced to the pressure receiving surface, a resistance of the gauge resistor is changed, and a detection signal corresponding to a resistance change is output through the wiring and the terminal to the external circuit, the wiring includes an embedded portion, the embedded portion is embedded in the hole of the semiconductor substrate through an inner wall insulation film so that the embedded portion is insulated from the semiconductor substrate with the inner wall insulation film and is embedded in the first through hole of the base through the inner wall insulation film, and electrically couple with the gauge resistor, the embedded portion is covered with the protection cap so that the embedded portion is isolated from the pressure medium, the base directly contacts the mounting surface of the case so that the embedded portion is directly coupled with the terminal, the pressure medium is introduced into the hollow portion, and a connection portion between the embedded portion and the terminal is isolated from the hollow portion.

21. A method for manufacturing a pressure sensor for detecting pressure of a pressure medium, the method comprising:

forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm;

forming a hole in the substrate, wherein the hole penetrates the substrate from the first side to the second side;

forming an inner wall insulation film on an inner wall of the hole;

forming an embedded portion of a wiring in the hole of the substrate through the inner wall insulation film so that the embedded portion is insulated from the semiconductor substrate with the inner wall insulation film and the embedded portion is electrically coupled with the gauge resistor;

forming an interlayer insulation film on the gauge resistor, and forming a contact hole in the interlayer insulation film;

forming a surface portion of the wiring in the contact hole and on the interlayer insulation film so as to electrically couple between the gauge resistor and the embedded portion;

forming a protection film including at least one of an oxide film and a nitride film on the semiconductor substrate with the surface portion and the gauge resistor;

forming a protection cap having a second diaphragm, which is formed by thinning the protection cap to have a second concavity, wherein the second concavity provides the second diaphragm;

bonding the protection cap on the first side of the substrate through a connection layer made of a $SiO_2$ film or a metallic film in such a manner that the second diaphragm faces the gauge resistor and the second concavity accommodates the first diaphragm and the embedded portion of the wiring;

forming a case including a hollow portion for accommodating the sensor chip with the protection cap and a mounting surface for mounting the sensor chip, wherein the case further includes an air introduction port on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port;

mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port;

electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

22. The method according to claim 21, wherein
the case introduces the pressure medium to a pressure receiving surface of the protection cap, and introduces atmospheric air to the second side of the semiconductor substrate;

the embedded portion is covered with the protection cap so that the embedded portion is isolated from the pressure medium, and the seal member is disposed between the mounting surface of the case and the second side of the semiconductor substrate so that the seal member isolates the bump from the pressure medium and the atmospheric air.

23. A method for manufacturing a pressure sensor for detecting pressure of a pressure medium, the method comprising:

forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm;

forming a hole in the substrate, wherein the hole penetrates the substrate from the first side to the second side;

forming a concavity on a surface of the gauge resistor;

forming an inner wall insulation film in the hole of the substrate and on the concavity of the gauge resistor;

forming a contact hole in the inner wall insulation film on the gauge resistor;

forming an embedded portion of a wiring in the hole of the substrate through the inner wall insulation film and in the contact hole through the inner wall insulation film so that the embedded portion is insulated from the semiconductor substrate with the inner wall insulation film and the embedded portion is electrically coupled with the gauge resistor;

forming a protection cap having a through hole, which penetrates the protection cap;

bonding the protection cap on the first side of the substrate through a connection layer made of a SiO$_2$ film or a metallic film in such a manner that the first diaphragm faces the through hole of the protection cap, and the protection cap covers the embedded portion of the wiring;

forming a case including a hollow portion for accommodating the sensor chip with the protection cap and a mounting surface for mounting the sensor chip, wherein the case further includes an air introduction port (2h) on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port;

mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port;

electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

24. The method according to claim 23, wherein
the case introduces the pressure medium to a pressure receiving surface of the first diaphragm, and introduces atmospheric air to the second side of the semiconductor substrate;

the embedded portion is covered with the protection cap so that the embedded portion is isolated from the pressure medium, and the seal member is disposed between the mounting surface of the case and the second side of the semiconductor substrate so that the seal member isolates the bump from the pressure medium and the atmospheric air.

25. A method for manufacturing a pressure sensor for detecting pressure of a pressure medium, the method comprising:

forming a sensor chip including a semiconductor substrate, a first diaphragm and a gauge resistor, wherein the semiconductor substrate has first and second sides, wherein the semiconductor substrate further includes a first concavity on the second side, wherein the first concavity provides a thin portion as the first diaphragm, and wherein the gauge resistor is disposed on the first diaphragm;

forming a hole in the substrate, wherein the hole penetrates the substrate from the first side to the second side so as to reach the gauge resistor;

forming an inner wall insulation film on an inner wall of the hole;

forming an embedded portion of a wiring in the hole of the substrate through the inner wall insulation film so that the embedded portion is insulated from the semiconductor substrate with the inner wall insulation film and the embedded portion is electrically coupled with the gauge resistor;

forming a protection cap for covering the first side of the substrate, wherein the protection cap is made of an epitaxial growth layer or a silicon nitride covering film;

forming a case including a hollow portion for accommodating the sensor chip with the protection cap and a mounting surface for mounting the sensor chip, wherein the case further includes an air introduction port on the mounting surface, wherein the case further includes a terminal, a part of which is exposed from the mounting surface, wherein the hollow portion includes a first hollow portion and a second hollow portion, and wherein the pressure medium is introduced into the first hollow portion, and atmospheric air is introduced into the second hollow portion through the air introduction port;

mounting the sensor chip with the protection cap on the mounting surface of the case in such a manner that a bump is sandwiched between the mounting surface and the second side of the substrate, wherein the bump is surrounded with the seal member, and wherein the seal member having a ring shape surrounds the air introduction port;

electrically coupling a part of the embedded portion of the wiring and the part of the terminal with the bump, wherein the part of the embedded portion is exposed on the second side of the substrate, and the part of the terminal is exposed from the mounting surface of the case; and separating the first hollow portion from the second hollow portion with the seal member.

26. The method according to claim 25, wherein the case introduces the pressure medium to a pressure receiving surface of the protection cap, and introduces atmospheric air to the second side of the semiconductor substrate;

the embedded portion is covered with the protection cap so that the embedded portion is isolated from the pressure medium, the seal member is disposed between the mounting surface of the case and the second side of the semiconductor substrate so that the seal member isolates the bump from the pressure medium and the atmospheric air, and the embedded portion does not reach the first side of the substrate.

* * * * *